(12) United States Patent
Wang et al.

(10) Patent No.: US 12,384,630 B2
(45) Date of Patent: Aug. 12, 2025

(54) MATERIAL CONVEYING MODULE AND MATERIAL CONVEYING APPARATUS

(71) Applicant: Delta Electronics (Shanghai) Co., Ltd., Shanghai (CN)

(72) Inventors: Cheng Wang, Shanghai (CN); Yi Li, Shanghai (CN); Tien-Wei Lan, Shanghai (CN); Qi Wei, Shanghai (CN); Chao Lu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 776 days.

(21) Appl. No.: 17/456,371

(22) Filed: Nov. 23, 2021

(65) Prior Publication Data
US 2022/0185589 A1 Jun. 16, 2022

(30) Foreign Application Priority Data
Dec. 14, 2020 (CN) .......................... 202011467079.0

(51) Int. Cl.
*B65G 43/00* (2006.01)
*B65G 15/20* (2006.01)
(Continued)

(52) U.S. Cl.
CPC ............. *B65G 43/00* (2013.01); *B65G 15/20* (2013.01); *B65G 17/26* (2013.01); *B65G 35/06* (2013.01);
(Continued)

(58) Field of Classification Search
CPC ................... B65G 43/00; B65G 35/06; B65G 2201/0258; B65G 2203/0233;
(Continued)

(56) References Cited

U.S. PATENT DOCUMENTS 4,435,752 A * 3/1984 Winkelman .......... G06F 3/0601
4,766,547 A 8/1988 Modery et al.
(Continued)

FOREIGN PATENT DOCUMENTS

CN 2428777 Y * 5/2001
CN 203359591 U * 12/2013
(Continued)

OTHER PUBLICATIONS

Li, CN-109368240-A (Year: 2019).*
(Continued)

*Primary Examiner* — Ernesto A Suarez
*Assistant Examiner* — Laurence R Brothers
(74) *Attorney, Agent, or Firm* — CKC & Partners Co., LLC

(57) ABSTRACT

The present disclosure provides a material conveying module and a material conveying apparatus, where the material conveying module includes a driving part and a sub-controlling module; the driving part is configured to drive a material tray of the material conveying apparatus to move, the sub-controlling module is fixed on the driving part, and an end of the sub-controlling module is signal-connected to the driving part and another end of the sub-controlling module is configured to signal-connect to a master controlling module of the material conveying apparatus, and the sub-controlling module is configured to, under an action of the master controlling module, control the driving part to operate.

15 Claims, 10 Drawing Sheets

(51) Int. Cl.
 *B65G 17/26* (2006.01)
 *B65G 35/06* (2006.01)
 *B65G 37/00* (2006.01)
 *B65G 43/10* (2006.01)
 *B65G 47/52* (2006.01)

(52) U.S. Cl.
 CPC ............ *B65G 37/00* (2013.01); *B65G 43/10* (2013.01); *B65G 47/52* (2013.01); *B65G 2201/0258* (2013.01); *B65G 2203/0233* (2013.01); *B65G 2203/042* (2013.01); *B65G 2207/30* (2013.01)

(58) Field of Classification Search
 CPC .......... B65G 2203/042; B65G 2207/30; B65G 15/20; B65G 17/26; B65G 37/00; B65G 43/10; B65G 47/52
 See application file for complete search history.

(56) References Cited

U.S. PATENT DOCUMENTS

| | | | | |
|---|---|---|---|---|
| 4,845,843 | A | * | 7/1989 | Babcock ............ G01R 31/2808 29/829 |
| 5,186,308 | A | * | 2/1993 | Munro ................ G05B 19/052 198/572 |
| 6,523,417 | B1 | * | 2/2003 | Donahue ............. B60N 2/0224 250/221 |
| 7,212,113 | B2 | | 5/2007 | Zanovitch |
| 9,733,638 | B2 | | 8/2017 | Ziegler et al. |
| 10,438,034 | B2 | * | 10/2019 | Wagner ................ B07C 5/3412 |
| 11,377,304 | B2 | | 7/2022 | Harnesk |
| 2002/0185358 | A1 | | 12/2002 | Zeitler et al. |
| 2018/0004195 | A1 | | 1/2018 | Finke |
| 2022/0281691 | A1 | | 9/2022 | Suzuki |

FOREIGN PATENT DOCUMENTS

| | | | | | |
|---|---|---|---|---|---|
| CN | 104793596 | A | | 7/2015 | |
| CN | 204751577 | U | * | 11/2015 | |
| CN | 105773144 | A | | 7/2016 | |
| CN | 205952844 | U | * | 2/2017 | |
| CN | 206010586 | U | | 3/2017 | |
| CN | 107720163 | A | | 2/2018 | |
| CN | 207008400 | U | | 2/2018 | |
| CN | 108792494 | A | | 11/2018 | |
| CN | 109368240 | A | * | 2/2019 | ............ B65G 43/08 |
| CN | 109533844 | A | * | 3/2019 | |
| CN | 109690430 | A | | 4/2019 | |
| CN | 209973537 | U | | 1/2020 | |
| EP | 1807329 | B1 | * | 5/2008 | ......... B65G 47/5131 |
| JP | 2009010243 | A | * | 1/2009 | |
| KR | 20020071318 | A | | 9/2002 | |
| TW | 374034 | B | | 11/1999 | |
| TW | 201215553 | A | | 4/2012 | |
| TW | 201404697 | A | * | 2/2014 | ............ B65G 37/02 |
| WO | 2003104115 | A1 | | 12/2003 | |

OTHER PUBLICATIONS

Yin, CN-109533844-A (Year: 2019).*
Ji, CN-203359591-U (Year: 2013).*
Cao, CN 205952844 (Year: 2017).*
Huang, CN-2428777-Y (Year: 2001).*
Dirmeier, EP-1807329-B1 (Year: 2008).*
Murakami, JP-2009010243-A (Year: 2009).*
Takada, TW-201404697-A (Year: 2014).*
He, CN-204751577-U (Year: 2015).*
CN-109533844-A (Year: 2019).*
Corresponding Taiwan office action issued on Sep. 5, 2022.
Related office action of CN202011467060.6 issued on Dec. 25, 2023.
Related office action of CN202011467079.0 issued on Dec. 25, 2023.
Corresponding Taiwan office action issued on Jan. 9, 2023 and its English translation.
The office action of U.S. Appl. No. 17/456,561 mailed on Jun. 9, 2025.

* cited by examiner

MATERIAL CONVEYING MODULE AND MATERIAL CONVEYING APPARATUS

CROSS-REFERENCE TO RELATED APPLICATIONS

This application claims priority to Chinese Patent Application No. 202011467079.0, filed with the China National Intellectual Property Administration on Dec. 14, 2020, which is incorporated herein by reference in its entirety.

TECHNICAL FIELD

The present disclosure relates to the field of material conveying technology, and in particular, to a material conveying module and a material conveying apparatus.

BACKGROUND

Material conveying is an important link in the production process of products. Generally, materials in a production link are conveyed to another production link through a material conveying apparatus to ensure normal production of stage products in the another production link, thus realizing the production of final products.

In the prior art, the material conveying apparatus includes a frame and a delivering part arranged on the frame. A material tray is placed on the delivering part, and the material tray is configured to hold a material to be conveyed. In addition, the material conveying apparatus also includes a driving part, and the driving part is configured to drive the delivering part to move or drive the material tray to move, so that the material tray can perform actions such as linear conveying, reversing, lifting. At present, the driving part is communicatively connected to a master controlling module of the material apparatus directly to realize automatic control of the driving part through the master controlling module.

However, once the production line layout of the material conveying apparatus is changed, the mechanism and electrical of the material conveying apparatus as well as programs in the master controlling module all need to be changed, which seriously increases the labor input cost and workload.

SUMMARY

The present disclosure provides a material conveying module and a material conveying apparatus to overcome the problem that once the production line layout of the existing material conveying apparatus is changed, the mechanism and electrical of the material conveying apparatus as well as programs in the overall control module all need to be changed, thereby seriously increasing the labor input cost and workload.

In a first aspect, the present disclosure provides a material conveying module applied to a material conveying apparatus, where the material conveying module includes a driving part and a sub-controlling module;

the driving part is configured to drive a material tray of the material conveying apparatus to move, the sub-controlling module is fixed on the driving part, and an end of the sub-controlling module is signal-connected to the driving part and another end of the sub-controlling module is configured to signal-connected to a master controlling module of the material conveying apparatus, and the sub-controlling module is configured to, under an action of the master controlling module, control the driving part to operate.

In an optional implementation, the driving part includes any one of a linear conveying part, a translating and reversing part, a lifting part, a curved conveying part, a jacking positioning part, a buffering part, a rotating part, a flipping part and a climbing part.

In an optional implementation, the driving part includes a linear conveying part, where the linear conveying part includes a motor and a transmission part;
the material tray is placed on the delivering part of the material conveying apparatus, the transmission part is connected to the delivering part, the motor is connected to the transmission part, and the motor drives, through the transmission part, the delivering part to move to drive the material tray to move; and
the sub-controlling module is signal-connected to the motor.

In an optional implementation, the driving part includes a translating and reversing part, where the translating and reversing part includes a sub-driving part and a mobile platform, the sub-driving part is located on a back side of the delivering part of the material conveying apparatus, the mobile platform is disposed on a side of the sub-driving part facing the delivering part, the sub-controlling module is fixed on the sub-driving part, and the sub-controlling module is signal-connected to the sub-driving part;
the sub-controlling module is configured to, when the material tray on a front side of the delivering part moves to the mobile platform, control the sub-driving part to drive the mobile platform to move toward the front side of the delivering part, to lift the material tray; and
a conveying part is provided on the mobile platform, and the sub-controlling module is signal-connected to the conveying part to, when the sub-driving part completes a lifting operation, drive the material tray to move perpendicular to an extending direction of the delivering part by driving the conveying part.

In an optional implementation, the sub-driving part is a jacking cylinder, where a movable end of the jacking cylinder is connected to the mobile platform, and the sub-controlling module is signal-connected to an electromagnetic valve of the jacking cylinder to control the jacking cylinder to operate.

In an optional implementation, the conveying part includes a conveying driving part and a sub-delivering part, where the conveying driving part is connected to the sub-delivering part, to drive the sub-delivering part to move perpendicular to the extending direction of the delivering part, and the sub-controlling module is signal-connected to the conveying driving part to control the conveying driving part to operate.

In an optional implementation, the translating and reversing part further includes an operation position blocking cylinder and an operation position sensor provided on the mobile platform, where the operation position sensor and the operation position blocking cylinder are both signal-connected to the sub-controlling module,
the material tray is provided with a first positioning hole and a first detecting pin, and when the operation position sensor detects the first detecting pin, the operation position sensor sends a positioning completion signal to the sub-controlling module, and when receiving the positioning completion signal, the sub-controlling module controls the operation position blocking cylinder to extend into the first positioning hole.

In an optional implementation, the translating and reversing module further includes at least one fixing seat provided on the sub-driving part, where the fixing seat is mounted on the frame of the material conveying apparatus.

In an optional implementation, at least one fixing seat is arranged at an upstream end of the sub-driving part along a material conveying direction;

the translating and reversing part further includes a preset blocking cylinder and a preset sensor provided on the fixing seat, and the preset blocking cylinder and the preset sensor are both signal-connected to the sub-controlling module;

the material tray is provided with a second positioning hole and a second detecting pin, and when the preset sensor detects the second detecting pin, the preset sensor transmits a upstream material tray positioning completion signal to the sub-controlling module, and when receiving the upstream material tray positioning completion signal, the sub-controlling module controls the preset blocking cylinder to extend into the second positioning hole.

In an optional implementation, the material conveying module further includes at least two quick plugs, the quick plugs are provided on the sub-controlling module, and the at least two quick plugs are configured to connect to a sub-controlling module of an adjacent and same material conveying module through a cable integrating electricity, gas and signals; and a sub-controlling module of one material conveying module of all same material conveying modules is signal-connected to the master controlling module by a cable inserted into another of the quick plugs.

In a second aspect, the present disclosure provides a material conveying apparatus, including at least one conveying module group and a master controlling module;

each conveying module group includes a frame, a delivering part, and at least one material conveying module as described above, the delivering part and the material conveying module are both arranged on the frame, and the material conveying module is configured to drive a material tray on the delivering part to move, and the master controlling module is signal-connected to the material conveying module to control the material conveying module to operate.

In an optional implementation, the conveying module group further includes a module group controlling module; and a sub-controlling module in the material conveying module is signal-connected to the module group controlling module, the module group controlling module is signal-connected to the master controlling module, and the master controlling module controls, through the module group controlling module, the sub-controlling module to operate.

In an optional implementation, the sub-controlling module includes a digital and analog signal inputting sub-module, a digital and analog signal outputting sub-module, and a controlling and communicating sub-module; the module group controlling module includes a logic and arithmetic processing sub-module and a communicating sub-module;

the digital and analog signal inputting sub-module is configured to collect an operation signal of a driving part in the material conveying module, and transmit the operation signal to the controlling and communicating sub-module;

the controlling and communicating sub-module is configured to receive the operation signal, and transmit the operation signal to the communicating sub-module;

the communicating sub-module is configured to receive the operation signal, and transmit the operation signal to the master controlling module;

the master controlling module is configured to receive the operation signal, and process the operation signal into a control signal, and transmit the control signal to the logic and arithmetic processing sub-module through the communicating sub-module;

the logic and arithmetic processing sub-module is configured to receive the control signal, and convert the control signal into a control instruction, and at a same time transmit the control instruction to the communicating sub-module; and the communicating sub-module is configured to receive the control instruction, and transmit the control instruction to the digital and analog signal outputting sub-module through the controlling and communicating sub-module, and the digital and analog signal outputting sub-module controls the driving part according to the control instruction.

In an optional implementation, the master controlling module is further configured to generate configuration file information and transmit the configuration file information to the communicating sub-module;

the communicating sub-module is configured to receive the configuration file information, and transmit the configuration file information to the logical and arithmetic processing sub-module;

the logic and arithmetic processing sub-module is configured to receive the configuration file information, parse the configuration file information and convert the configuration file information into a control instruction, and then transmit the control instruction to the communicating sub-module;

the communicating sub-module receives the control instruction and transmits the control instruction to the sub-controlling module; and the sub-controlling module configures a port of the sub-controlling module as an input or output port of a designated function according to the control instruction;

where the designated function includes any one of linear conveying, translating and reversing, lifting, curved conveying, jacking positioning, buffering, rotating, flipping and climbing.

In an optional implementation, each conveying module group includes a plurality of material conveying modules, where the plurality of material conveying modules are same or different;

sub-controlling modules in two adjacent and same material conveying modules are signal-connected, and the sub-controlling module of one material conveying module of all same material conveying modules is signal-connected to the module group controlling module.

In an optional implementation, the material conveying apparatus includes q plurality of conveying module groups; and the plurality of conveying module groups are arranged in sequence along a material conveying direction, and the module group controlling modules of two adjacent conveying module groups are signal-connected, and an outermost module group controlling module arranged along the material conveying direction is signal-connected to the master controlling module.

In an optional implementation, the conveying module group includes multiple groups of delivering parts arranged on the frame, and each group of delivering parts extends along the material conveying direction, and each group of delivering parts forms a conveying line; and the multiple groups of delivering parts are arranged side-by-side along a direction perpendicular to the material conveying direction, and movement directions of two adjacent groups of delivering parts are opposite.

The present disclosure provides a material conveying module and a material conveying apparatus. By providing a sub-controlling module in the material conveying module and fixing the sub-controlling module on the driving part, all connecting wires on the driving part are connected to the sub-controlling module, so that the material conveying module forms a modular structure with a specific function, and direct transmission of control signals is realized between the driving part and the sub-controlling module. In this way, it is only necessary to write all operation programs of the driving part into the sub-controlling module, and complete port function configuration of the master controlling module and the sub-controlling module by retrieving the configuration file information corresponding to a function mode of the driving part in the master controlling module, and then a corresponding function of the sub-controlling module can be started through the master controlling module, thereby enabling the sub-controlling module to realize the specific control of the driving part. When the layout of the production line of the material conveying apparatus changes, for example, when the position of the driving part in the material conveying apparatus changes, since the sub-controlling module and the driving part together form an independent modular structure, there is no need to rewire between the driving part and the master controlling module, and thus, the programs in the master controlling module and the sub-controlling module do not need to be changed, and it is only needed to retrieve corresponding configuration file information of the master controlling module and then the ports of the master controlling module and the sub-controlling module can be configured as the input or output of a designated function, thus realizing the accurate control of the driving part under the new layout. In addition, because the driving part and the sub-controlling module form a modular structure, the assembly and disassembly procedures of the material conveying module are simplified, and the labor input cost and workload are reduced.

BRIEF DESCRIPTION OF DRAWINGS

In order to explain the embodiments of the present disclosure or the technical solutions in the prior art more clearly, the following will briefly introduce the accompanying drawings that need to be used in the description of the embodiments or the prior art. Obviously, the drawings in the following description are some embodiments of the present disclosure, and for persons of ordinary skill in the art, other accompanying drawings may be obtained according to these accompanying drawings without paying any creative efforts.

EXPLANATION OF ACCOMPANYING DRAWINGS NUMBERS

Figure 1:
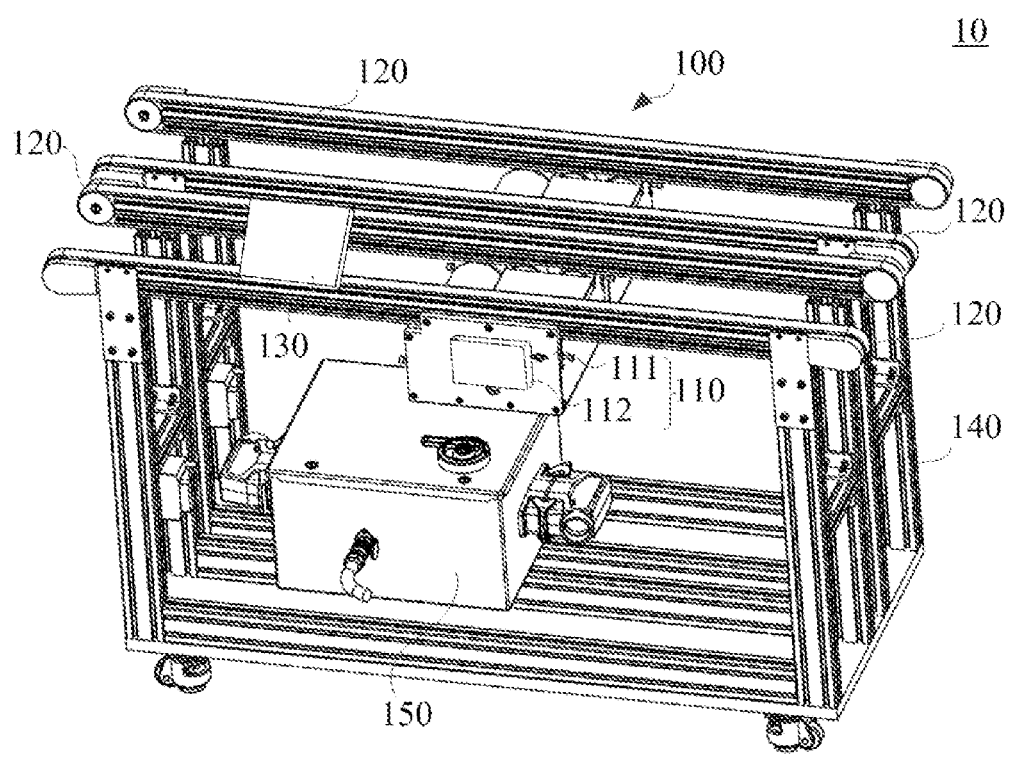
FIG. 1 is a partial schematic diagram of having one conveying module group in a first structure of a material conveying apparatus provided by an embodiment of the present disclosure.

10—material conveying apparatus; 20—machine platform;
100—conveying module group; 200—cable;
110—material conveying module; 120—delivering part; 130—material tray; 140—frame; 150—module group controlling module;
111—driving part; 112—sub-controlling module; 113—quick plug; 114—linear conveying module; 115—translating and reversing module; 131—first positioning hole; 132—first detecting pin; 133—second positioning hole; 134—second detecting pin; 135—third detecting pin; 136—upstream material tray; 137—downstream material tray; 151—connection port; and
1111—sub-driving part; 1112—mobile platform; 1113—conveying part; 1114—operation position sensor; 1115—operation position blocking cylinder; 1116—fixing seat; 1117—screw; 1118—preset blocking cylinder; 1119—preset sensor.

DESCRIPTION OF EMBODIMENTS

In order to make the purpose, technical solutions and advantages of the embodiments of the present disclosure clearer, the following will clearly and completely describe the technical solutions in the embodiments of the present disclosure with reference to the accompanying drawings in the embodiments of the present disclosure. Obviously, the described embodiments are a part of the embodiments of the present disclosure, but not all of the embodiments. Based on the embodiments of the present disclosure, all other embodiments obtained by persons of ordinary skill in the art without creative work belong to the protection scope of the present disclosure.

A conventional material conveying apparatus includes a frame, and a delivering part and a driving part arranged on the frame, where a material tray is placed on the delivering part and the material tray is configured to hold a material to be conveyed. The driving part is arranged on one side of the delivering part, and the driving part is connected to the delivering part or the material tray. During operation, the driving part drives the delivering part to move or drives the material tray to move, so that the material tray performs actions such as linear conveying, translating and reversing, or lifting and lowering.

In order to realize the automatic control of the driving part in the material conveying apparatus, the conventional material conveying apparatus also includes a master controlling module, where the master controlling module has a logic controlling program of the driving part stored therein and has a port with a specific function. Generally, the driving part includes one or more components, and each component is signal-connected to a corresponding port in the master controlling module.

During operation, the master controlling module configures each port as a corresponding functional port, and then automatically controls each component in the driving part to perform corresponding actions, so as to drive the material tray correspondingly.

However, the mechanism and electrical of the material conveying apparatus as well as programs in the master controlling module all need to be changed when the layout of the production line of the material conveying apparatus changes. For example, when the position of the driving part in the material conveying apparatus changes on the conveying line, it is necessary to reconnect the cables of respective components on the driving part to the corresponding ports of the master controlling module. At the same time, due to the change of the direction of the whole process, it is necessary to re-change the logic programs in the master controlling module and at the same time reconfigure respective ports of the master controlling module, which seriously increases the labor input cost and workload.

It should be noted that, the position of the driving part in the material conveying apparatus on the conveying line changes specifically refers to that the position of the driving part on the conveying line in the same conveying direction changes, or that the driving part is moved from a conveying line in a conveying direction to another conveying line in a different conveying direction.

The embodiments of the present application provide a material conveying module and a material conveying apparatus. By providing a sub-controlling module in the material conveying module and fixing the sub-controlling module on the driving part, all connecting wires on the driving part are connected to the sub-controlling module, so that the material conveying module forms a modular structure with a specific function, and direct transmission of control signals is realized between the driving part and the sub-controlling module. In this way, it is only necessary to write all operation programs of the driving part into the sub-controlling module, and complete port function configuration of the master controlling module and the sub-controlling module by retrieving configuration file information corresponding to the function mode of the driving part in the master controlling module, an then a corresponding function of the sub-controlling module can be started through the master controlling module, thereby enabling the sub-controlling module to realize the specific control of the driving part. When the layout of the production line of the material conveying apparatus changes, for example, when the position of the driving part in the material conveying apparatus changes, since the sub-controlling module and the driving part together form an independent modular structure, there is no need to rewire between the driving part and the master controlling module, and thus the programs in the master controlling module and the sub-controlling module do not need to be changed, and it is only needed to retrieve the corresponding configuration file information of the master controlling module and then the ports of the master controlling module and the sub-controlling module can be configured as an input or output of a designated function, thus realizing the accurate control of the driving part under the new layout, and effectively reducing the labor input cost and workload.

The specific structures of the material conveying module and the material conveying apparatus of the embodiments of the present application are described in detail below.

First Embodiment

FIG. 1 is a partial schematic diagram of having one conveying module group in a first structure of a material conveying apparatus provided by the present embodiment. Referring to FIG. 1, the present embodiment provides a material conveying module 110, where the material conveying module 110 is applied to a material conveying apparatus 10.

In practical application, the material conveying apparatus 10 also includes a frame 140, a delivering part 120 and a material tray 130, where the delivering part 120 is arranged on the frame 140, the delivering part 120 extends along a material conveying direction, and the material tray 130 is placed on the front side of the delivering part 120. It should be noted that the front side of the delivering part 120 is the side of the delivering part 120 away from the inside of the frame 140. Universal wheels are arranged at the bottom of the frame 140, so as to facilitate rapid moving of the material conveying apparatus 10.

Referring to FIG. 1, in the present embodiment, the material conveying apparatus 10 includes at least two groups of delivering parts 120, where two groups of delivering parts 120 are respectively arranged side-by-side along a direction perpendicular to the material conveying direction, each group of delivering parts 120 forms a conveying line, and the movement directions of the two groups of delivering parts 120 are opposite. For example, referring to FIG. 1, one group of delivering parts 120 rotates clockwise, that is, respective positions on the front side of the delivering parts 120 move toward the right end of the frame 140, and the other group of delivering parts 120 rotates counterclockwise, that is, the positions on the front side of the delivering part 120 move toward the left end of the frame 140, and the two groups of delivering parts 120 realize a "going-returning" material conveying loop.

Each group of delivering parts 120 may include two delivering parts 120 arranged side-by-side in a direction perpendicular to the material conveying direction, and two ends of the material tray 130 are placed on the two parallel delivering parts 120, and with the movement of the delivering parts 120, the material tray 130 also moves in the material conveying direction.

It should be noted that, in the present embodiment, the material conveying direction refers to a moving direction of the material tray 130 in an extending direction of the delivering part 120.

The delivering part 120 may be a conveyor belt, such as a belt, or a conveying chain. The embodiments of the present application do not limit the structure of the delivering part 120, as long as the material tray 130 can be conveyed.

Referring to FIG. 1, the material conveying module 110 of the present embodiment is arranged on the frame 140. The material conveying module 110 includes a driving part 111 and a sub-controlling module 112, where the driving part 111 is configured to drive the material tray 130 of the material conveying apparatus 10 to move.

For example, the driving part 111 may be connected to the delivering part 120, and the driving part 111 is configured to drive the delivering part 120 to move along the material conveying direction, thereby driving the material tray 130 on the delivering part 120 to move along the material conveying direction.

For another example, the driving part 111 can be directly connected to the material tray 130 for driving the material tray 130 to move along the material conveying direction, or the driving part 111 drives the material tray 130 to move along the direction perpendicular to the material conveying direction, so that the material tray 130 can be translated from one of the conveyor lines to another side-by-side conveyor line.

The sub-controlling module 112 of the present embodiment is fixed on the driving part 111, and an end of the sub-controlling module 112 is signal-connected to the driving part 111. Automatic control of the driving part 111 is realized through the sub-controlling module 112, and then accurate driving of the material tray 130 is completed.

In practical application, the material conveying apparatus 10 further includes a master controlling module (not shown in the figure), and the other end of the sub-controlling module 112 of the material conveying module 110 is signal-connected to the master controlling module. Under general control of the master controlling module, the sub-controlling module 112 completes intelligent control of the driving part 111.

In the embodiment of the present application, the sub-controlling module 112 may be fixed to the driving part 111 through screws, buckles and other detachable ways, and each component in the driving part 111 is signal-connected to the sub-controlling module 112. In addition, all operation programs of the driving part 111 are written into the sub-controlling module 112 of the material conveying module 110 respectively, so that the material conveying module 110 forms a modular structure with a specific function.

Figure 2:
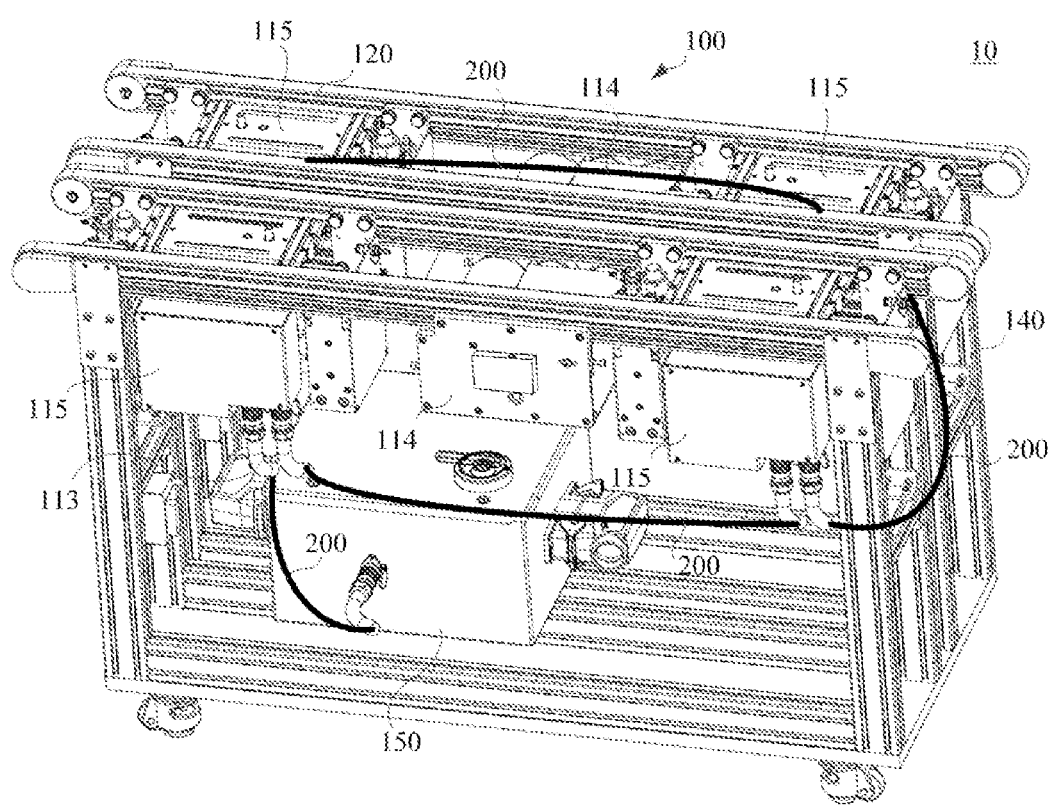
FIG. 2 is a partial schematic diagram of having one conveying module group in a second structure of the material conveying apparatus provided by an embodiment of the present disclosure.

FIG. 2 is a partial schematic diagram of having one conveying module group in a second structure of the material conveying apparatus provided by the present embodiment. Referring to FIG. 2, in the present embodiment, the driving part 111 may include, but is not limited to, any one of a linear conveying part, a translating and reversing part, a lifting part, a curved conveying part, a jacking positioning part, a buffering part, a rotating part, a flipping part and a climbing part, so, correspondingly, the material conveying module 110 formed by the driving part 111 and the sub-controlling module 112 includes, but is not limited to, any one of a linear conveying module 114 (as shown in FIG. 2) and a translating and reversing module 115 (as shown in FIG. 2), a lifting module, a curved conveying module, a jacking positioning module, a buffering module, a rotating module, a flipping module and a climbing module.

For example, when the driving part 111 is a linear conveying part (referring to FIG. 1 and FIG. 2, the specific structure of the linear conveying part is described below), a motor in the driving part 111 is signal-connected to the sub-controlling module 112, so that the material conveying module 110 formed by the driving part 111 and the sub-controlling module 112 is a modular structure with a linear conveying function, that is, the linear conveying module 114 (as shown in FIG. 2).

When the driving part 111 is a translating and reversing part (referring to FIG. 2 and FIG. 3, the specific structure of the translating and reversing part is described below), the sub-driving part 1111, the conveying parts 1113, the sensors and the like of the driving part 111 are all signal-connected to the sub-controlling module 112, so that the material conveying module 110 formed by the driving part 111 and the sub-controlling module 112 is a modular structure with a translating and reversing function, that is, the translating and reversing module 115 (as shown in FIG. 2).

It can be understood that each component in the driving part 111 can be signal-connected to the sub-controlling module 112 through a cable (not shown in the figure).

In practical operation, it is only necessary to configure the ports of the master controlling module and the sub-controlling module 112 corresponding to the function mode of the driving part 111. For example, by retrieving the configuration file information corresponding to the function of the driving part 111 in the master controlling module, the ports of the master controlling module and the sub-controlling module 112 can be configured as output and input of a specific function. In this way, the master controlling module performs starting of the corresponding function on the sub-controlling module 112, so that the sub-controlling module 112 realizes specific control of the driving part 111.

It can be understood that the control between the sub-controlling module 112 and the driving part 111 is that the sub-controlling module 112 controls the operation status of each component and the logical relationship between respective components, and the control between the master controlling module and the sub-controlling module 112 is function activation control of the sub-control module 112 by the master control module.

When the layout of the production line of the material conveying apparatus 10 changes, for example, when the position of the driving part 111 in the material conveying apparatus 10 changes, since the sub-controlling module 112 and the driving part 111 together form an independent modular structure, there is no need to rewire between the driving part 111 and the master controlling module, and thus the programs in the master controlling module and the sub-controlling module 112 do not need to be changed, and it is only needed to retrieve configuration file information corresponding a designated function in the master controlling module and then the ports of the master controlling module and the sub-controlling module 112 can be configured as the input or output of the designated function, thus realizing the accurate control of the driving part 111 under the new layout, and reducing the labor input cost and workload.

It should be noted that, in the present embodiment, the position of the driving part 111 in the material conveying module 110 on the conveying line changes specifically refers to that the position of the driving part 111 on the conveying line in the same conveying direction changes, or that the driving part 111 is transferred from a conveying line in a conveying direction to another conveying line in a different conveying direction.

In addition, because the driving part 111 and the sub-controlling module 112 form a modular structure, when the layout of the production line of the material conveying apparatus 10 changes, compared with the prior art, the modular material conveying module 110 formed by the driving part 111 and the sub-controlling module 112 not only facilitates installation and disassembly, but also facilitates the signal-connection between the material conveying module 110 and the master controlling module, thereby simplifying the assembly and disassembly procedures of the material conveying module 110 and the material conveying apparatus 10.

Referring to FIG. 1, the frame 140 of the material conveying apparatus 10 may be provided with a plurality of material conveying modules 110, where the plurality of material conveying module 110 may be the same or different, that is, the driving part 111 and the sub-controlling module 112 in the plurality of material conveying modules 110 may be the same, or the driving part 111 and the sub-controlling module 112 of at least two of the plurality of material conveying modules 110 may be different.

For example, referring to FIG. 1 and FIG. 2, two same material conveying modules 110 are arranged on the frame 140, where the two material conveying modules 110 are both linear conveying modules 114, and are respectively arranged in two conveying lines with different conveying directions.

For another example, referring to FIG. 2, two linear conveying modules 114 and four translating and reversing modules 115 are arranged on the frame 140, where the two linear conveying modules 114 are respectively arranged in two conveying lines with different conveying directions, and two of the translating and reversing modules 115 are respectively arranged at two ends of one conveying line, the other two of the translating and reversing modules 115 are respectively arranged at two ends of the other one conveying line.

In the present embodiment, the logic program in the sub-controlling module 112 corresponds to its corresponding driving part 111. For example, when the driving part 111 is a linear conveying part, the logic program in the sub-controlling module 112 fixed on the driving part 111 is a logic program of the linear conveying part, and when the driving part 111 is a lifting part, the logic program in the corresponding sub-controlling module 112 is a logic program of the lifting part.

The master controlling module in the material conveying apparatus 10 has configuration file information of respective function modules. When it is necessary to control a material conveying module 110 with a different function, it is only needed to retrieve the configuration file information corresponding to the material conveying module 110 and then the sub-controlling module 112 in the corresponding material conveying modules 110 can be controlled to operate correspondingly.

Referring to FIG. 1 and FIG. 2, when the driving part 111 of the present embodiment is a linear conveying part, the linear conveying part includes a motor and a transmission part (not shown in the figure), where the material tray 130 is placed on the delivering part 120 of the material conveying apparatus 10, the transmission part is connected to the delivering part 120, the motor is connected to the transmission part, the motor drives, through the transmission part, the delivering part 120 to move, so as to drive the material tray 130 to move in the material conveying direction, and the sub-controlling module 112 is signal-connected to the motor.

During operation, the master controlling module controls the sub-controlling module 112 to operate, and then the sub-controlling module 112 controls the motor to operate. Driven by the motor, the transmission part drivers the delivering part 120 to move along the material conveying direction, and then drives the material tray 130 on the delivering part 120 to move along the material conveying direction.

The motor may be a rotating motor, and the transmission part may be a pulley, where the pulley meshes with the motor, and the pulley and the delivering part 120 also mesh with each other. The sub-controlling module 112 controls the motor to rotate clockwise or counterclockwise, so as to drive the pulley to rotate, and the delivering part 120 moves on the frame 140 under the driving of the pulley.

It can be understood that when the delivering part 120 is a belt, the pulley, as the transmission part, and the belt can realize mutual transmission through friction between each other. For the transmission principle between the belt and the pulley, reference may be made directly to the prior art, which will not be repeated here.

Figure 3:
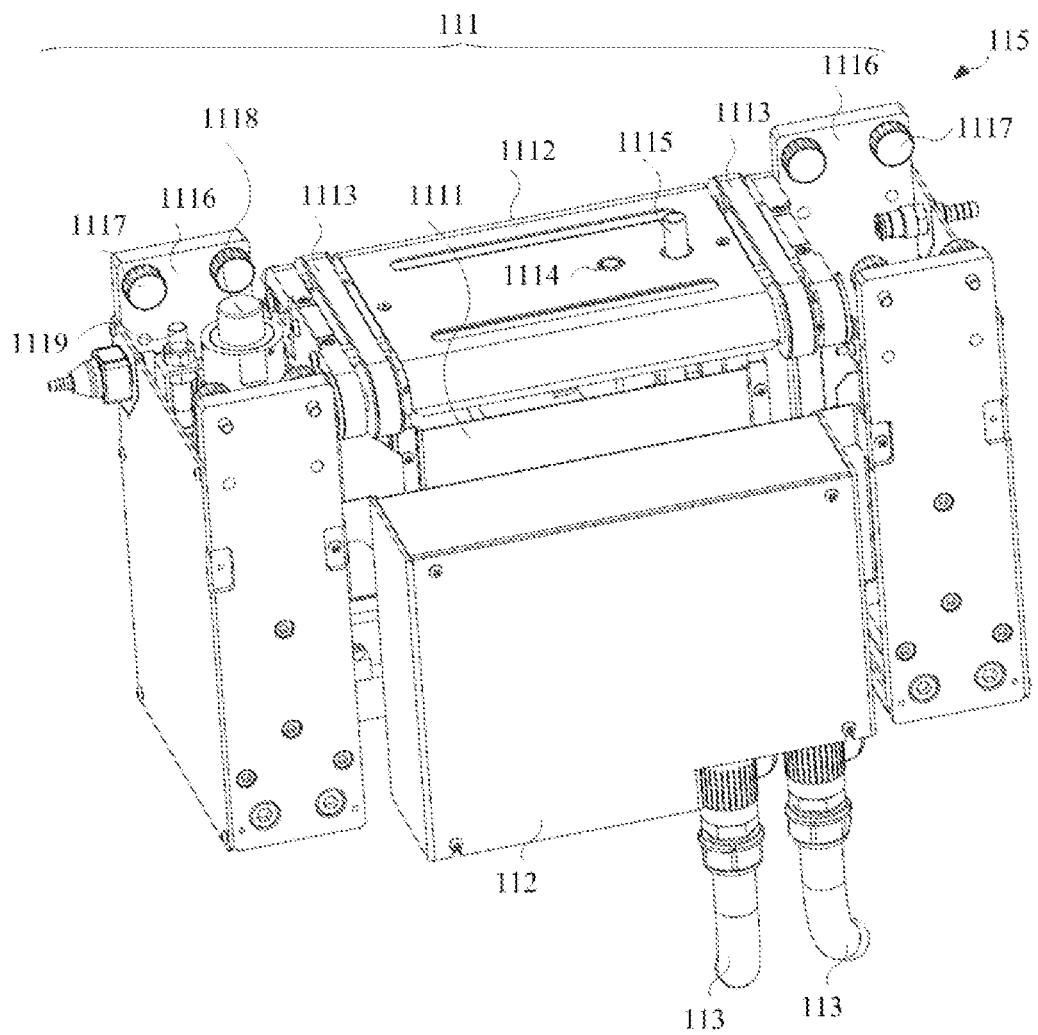
FIG. 3 is a schematic structural diagram of a translating and reversing module in FIG. 2.
Figure 4:
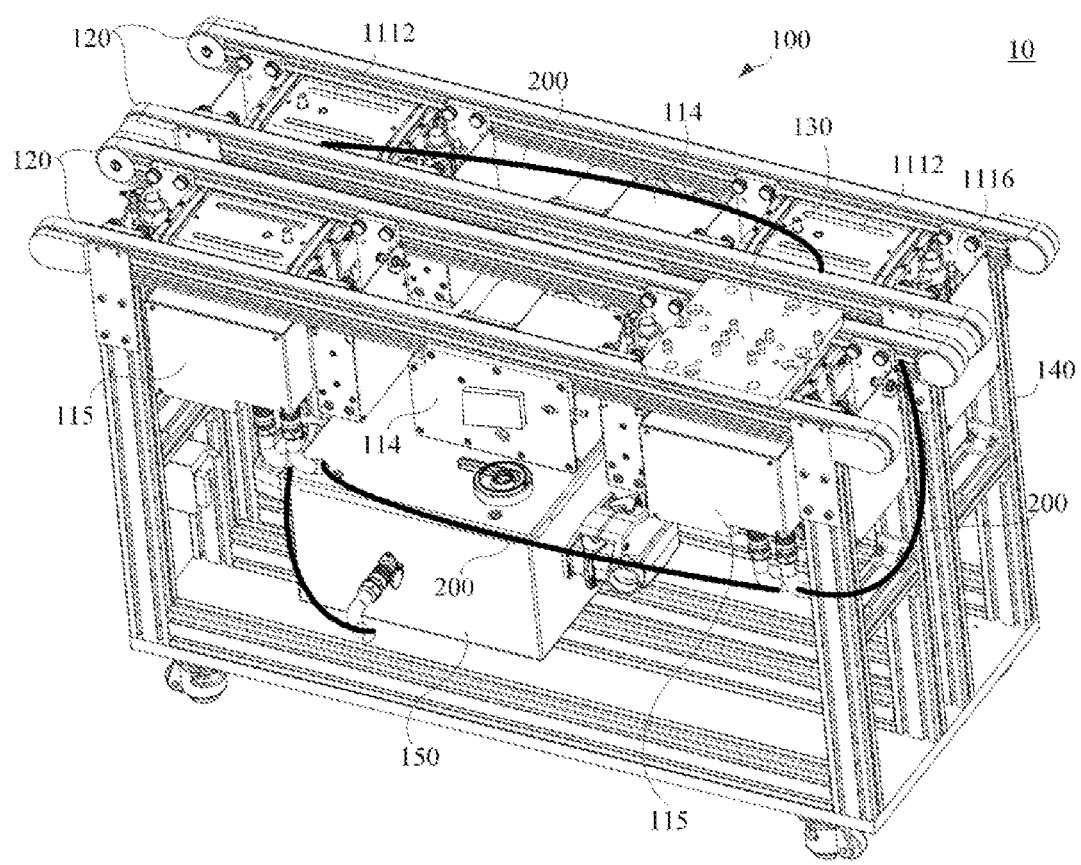
FIG. 4 is a state diagram of a material tray being positioned on a mobile platform in the second structure of the material conveying apparatus provided by an embodiment of the present disclosure.
Figure 5:
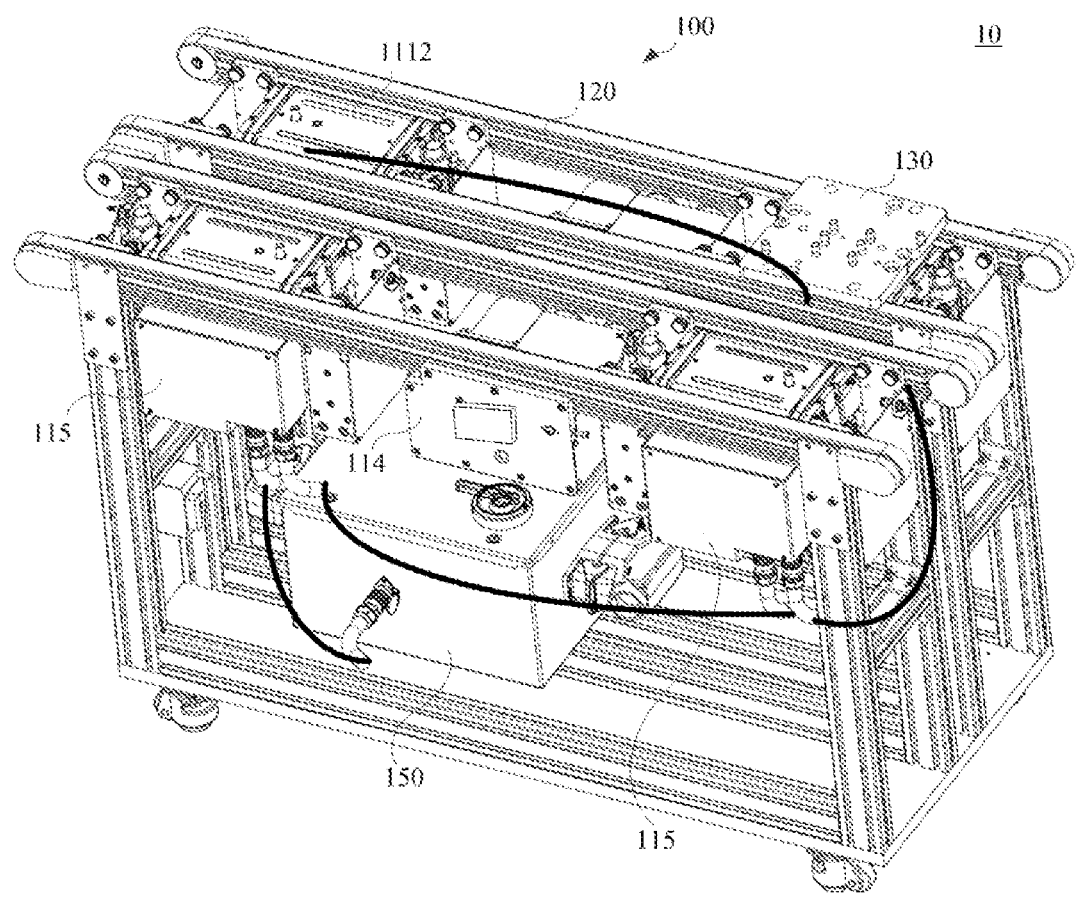
FIG. 5 is a state diagram of a material tray being translated to an adjacent conveying line in the second structure of the material conveying apparatus provided by an embodiment of the present disclosure.

FIG. 3 is a schematic structural diagram of the translating and reversing module in FIG. 2; FIG. 4 is a schematic structural diagram of a material tray being positioned on a mobile platform in the second structure of the material conveying apparatus provided by the present embodiment; and FIG. 5 is a schematic structural diagram of a material tray being translated to an adjacent conveying line in the second structure of the material conveying apparatus provided by the present embodiment. Referring to FIG. 2 to FIG. 5, when the material conveying module 110 is a translating and reversing module 115, that is, when the driving part 111 is a translating and reversing part, the translating and reversing part includes a sub-driving part 1111 and a mobile platform 1112, where the sub-driving part 1111 is located on the back side of the delivering part 120 of the material conveying apparatus 10, and the mobile platform 1112 is arranged on the side of the sub-driving part 1111 facing the delivering part 120, that is, the mobile platform 1112 is arranged between the sub-driving part 1111 and the delivering part 120. The sub-controlling module 112 is fixed on the sub-driving part 1111, and the sub-controlling module 112 is signal-connected to the sub-driving part 1111.

Referring to FIG. 4, in the present embodiment, when the material tray 130 on the front side of the delivering part 120 moves to the mobile platform 1112 of the translating and reversing part, the sub-controlling module 112 controls the sub-driving part 1111 to drive the mobile platform 1112 to move toward the front side of the delivering part 120, to lift up the material tray 130 so that the bottom of the material tray 130 separates from the front side of the delivering part 120.

Referring to FIG. 3, a conveying part 1113 is also provided on the mobile platform 1112, and the sub-controlling module 112 is signal-connected to the conveying part 1113. In this way, when the sub-driving part 1111 completes lifting operation, that is, when the sub-driving part 1111 lifts the material tray 130 to separate from the delivering part 120, the sub-controlling module 112 controls the conveying part 1113 to operate, to drive the material tray 130 to move along a direction perpendicular to the extending direction of the delivering part 120 until the material tray 130 is translated to the adjacent conveying line.

Referring to FIG. 4, the movement of the material tray 130 in the material conveying direction is controlled by the linear conveying module 114, and the translation of the material tray 130 in the direction perpendicular to the material conveying direction is controlled by the translating and reversing module 115, and the linear conveying module 114 and the translating and reversing module 115 are respectively signal-connected to the master controlling module.

Referring to FIG. 4, taking two conveying lines formed by two groups of delivering parts 120 arranged side-by-side as an example, a conveying line formed by one group of delivering parts 120 is a conveying line in a "going" direction, and a conveying line formed by another group of delivering parts 120 is a conveying line in a "returning" direction, and the material tray 130 is pre-placed on the conveying line in the "going" direction.

It should be noted that the "going" direction means that the delivering direction of the conveying line is a direction away from the current station, and the "returning" direction means that the delivering direction of the conveying line is a direction towards the current station.

Referring to FIG. 4 and FIG. 5, when it is necessary to move the material tray 130 on the conveying line in the "going" direction to the conveying line in the "returning" direction, firstly the sub-controlling module 112 of the linear conveying module 114 is controlled by the master controlling module to operate, and then the sub-controlling module 112 of the linear conveying module 114 controls the driving part 111 to drive the delivering part 120 in the "going" direction to move, so that the material tray 130 on the conveying line in the "going" direction is moved to the mobile platform 1112 of the translating and reversing module 115 until the material tray 130 is completely moved to the mobile platform 1112, as shown in FIG. 4.

When the material tray 130 is completely moved to the mobile platform 1112, the master controlling module starts to control the sub-controlling module 112 of the translating and reversing module 115 to operate, and the sub-controlling module 112 of the translating and reversing module 115 then controls the sub-driving part 1111 in the driving part 111 to drive the mobile platform 1112 to move to the front side of the delivering part 120, so as to lift up the material tray 130 until the bottom of the material tray 130 separates from the delivering part 120.

When the bottom of the material tray 130 separates from the delivering part 120, the sub-controlling module 112 continues to control the movement of the conveying part 1113 on the mobile platform 1112, so as to drive the material tray 130 on the mobile platform 1112 to move along a direction perpendicular to the conveying line in the "going" direction until the material tray 130 moves to the conveying line in the "returning" direction, and the transfer of the material tray 130 between the conveying lines with opposite conveying directions is completed, so that the conveying direction of the material tray 130 is changed, as shown in FIG. 5.

Referring to FIG. 3, in specific setting, the sub-driving 1111 in the translating and reversing module 115 may be a jacking cylinder, where a movable end of the jacking cylinder is connected to the mobile platform 1112, and the sub-controlling module 112 is signal-connected to an electromagnetic valve of the jacking cylinder, so as to control the jacking cylinder to operate. For example, referring to FIG. 4, when the material tray 130 moves to the mobile platform 1112 of the translating and reversing module 115, the sub-controlling module 112 controls the electromagnetic valve of the jacking cylinder to open, so that the jacking cylinder rise towards the direction close to the material tray 130, thereby driving the mobile platform 1112 to lift the material tray 130 from the back side of the delivering part 120 to the front side of the delivering part 120 until the material tray 130 on the mobile platform 1112 is lifted away from the delivering part 120.

For the structure and operating principle of the jacking cylinder, reference may be made directly to the prior art, which will not be repeated here.

In the present embodiment, in specific setting, the conveying part 1113 on the mobile platform 1112 may include a conveying driving part and a sub-delivering part (not shown in the figure), where the conveying driving part is connected to the sub-delivering part to drive the sub-delivering part to move along a direction perpendicular to the extending direction of the delivering part 120, and the sub-controlling module is signal-connected to the conveying driving part to control the conveying driving part to operate.

For example, when the jacking cylinder drives the material tray 130 on the mobile platform 1112 to rise away from the delivering part 120 in the "going" direction, the sub-controlling module 112 controls the conveying driving part to operate, to drive the sub-delivering part to move along a direction perpendicular to the extending direction of the delivering part 120, i.e. the material conveying direction, thus driving the material tray 130 on the sub-delivering part to be translated to the conveying line in the "returning" direction.

In specific implementation, the conveying driving part may be a motor and a pulley, and the sub-delivering part may be a belt connected to the pulley. Or, the conveying driving part may be a motor and a gear, and the sub-delivering part may be a chain meshed with the gear. During operation, the motor drives the gear to rotate, thereby driving the chain to move. The conveying driving part and the sub-delivering part may also be other transmission structures, and the present embodiment does not specifically limit the specific structure of the conveying driving part and the sub-delivering part.

Figure 6:
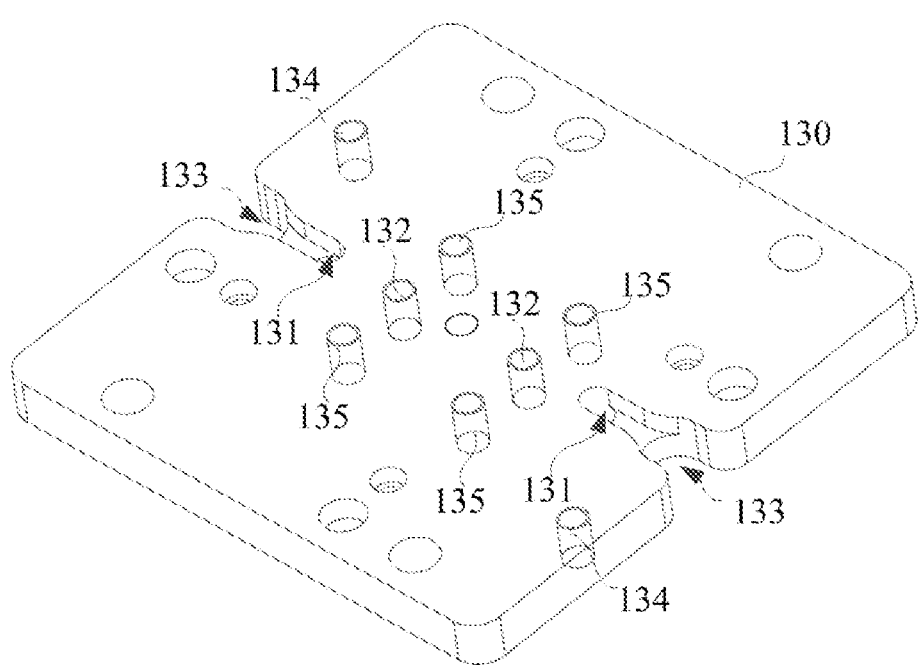
FIG. 6 is a schematic structure diagram of the material tray in FIG. 4.

FIG. 6 is a schematic structure diagram of the material tray in FIG. 4. Referring to FIG. 3 and FIG. 6, in order to improve the control accuracy of the material conveying module 110 to the material tray 130, the translating and reversing module 115 of the present embodiment also includes an operation position sensor 1114 and an operation position blocking cylinder 1115 which are provided on the mobile platform 1112, and the operation position sensor 1114 and the operation position blocking cylinder 1115 are both signal-connected to the sub-controlling module 112. Correspondingly, referring to FIG. 6, a first positioning hole 131 and a first detecting pin 132 are provided on the material tray 130.

When the operation position sensor 1114 detects the first detecting pin 132, the operation position sensor 1114 transmits a positioning completion signal to the sub-controlling module 112, and when receiving the positioning completion signal, the sub-controlling module 112 controls the operation position blocking cylinder 1115 to extend into the first positioning hole 131.

For example, under the control of the sub-controlling module 112 of the linear conveying module 114, the motor drives the transmission part to drive the material tray 130 to move to the mobile platform 1112 of the translating and reversing module 115. When the operation position sensor 1114 on the mobile platform 1112 detects the first detecting pin 132 on the material tray 130, the operation position sensor 1114 transmits a positioning completion signal to the sub-controlling module 112 of the translating and reversing module 115. When receiving the positioning completion signal, the sub-controlling module 112 of the translating and reversing module 115 controls the operation position blocking cylinder 1115 on the mobile platform 1112 to extend into the first positioning hole 131 of the material tray 130, so that the material tray 130 is stabilized in the horizontal direction of the mobile platform 1112, and will not be driven by the delivering part 120 to separate from the mobile platform 1112.

In the present embodiment, an operation position sensor 1114 is provided on the mobile platform 1112, and the operation position sensor 1114 is signal-connected to the sub-controlling module 112 of the translating and reversing module 115, so that the material tray 130 can be accurately moved to the mobile platform 1112, and it can be ensured that the sub-controlling module 112 timely controls the conveying part 1113 to translate the material tray 130 to the adjacent conveying line, which improves the moving efficiency and moving accuracy of the translating and reversing module 115 to the material tray 130.

It can be understood that, in order to ensure that the material tray 130 can be accurately moved to the mobile platforms 1112 on respective conveying lines in the "going" direction and the "returning" direction, two first positioning holes 131 and two first detecting pins 132 may be arranged on the material tray 130 at intervals along the extending direction of the delivering part 120.

Continuing to refer to FIG. 4 to FIG. 6, optionally, at least one third detecting pin 135 may be provided on the material tray 130, and a distance between the third detecting pin 135 and an end of the material tray 130 close to the conveying line to be transferred to is less than a distance between the first detecting pin 132 and an end of the material tray 130 close to the conveying line to be transferred to. For example, when the material tray 130 needs to be translated from the conveying line in the "going" direction to the conveying line in the "returning" direction, the distance between the third detecting pin 135 and the end of the material tray 130 close to the conveying line in the "returning" direction is less than the distance between the first detecting pin 132 and the end of the material tray 130 close to the conveying line in the "returning" direction.

When the material tray 130 is driven by the conveying part 1113 on the mobile platform 1112, to be translated to the mobile platform 1112 on the adjacent conveying line, for example, when the material tray 130 is translated from the mobile platform 1112 on the conveying line in the "going" direction to the mobile platform 1112 on the conveying line in the "returning" direction, the operation position sensor 1114 on the mobile platform 1112 on the conveying line in the "returning" direction can detect the third detecting pin 135 in advance, and when the operation position sensor 1114 detects the third detecting pin 135, the operation position sensor 1114 transmits a deceleration start signal to the sub-controlling module 112 of the translating and reversing module 115 on the conveying line in the "going" direction.

When receiving the deceleration start signal, the sub-controlling module 112 controls the conveying part 1113 of the translating and reversing module 115 to decelerate to reduce the translation speed of the material tray 130 on the conveying part 1113, so that the material tray 130 on the conveying line in the "going" direction is translated slowly and accurately to the mobile platform 1112 on the conveying line in the "returning" direction to avoid moving beyond the mobile platform 1112 of the conveying line in the "returning" direction due to an excessively fast translation speed.

The arrangement of the third detecting pin 135 makes the transfer of the material tray 130 between two adjacent conveying lines more accurate and controllable.

Referring to FIG. 6, in order to ensure that the translation of the material tray 130 can be accurate and controllable when moving back and forth between the conveying line in the "going" direction and the conveying line in the "returning" direction, a third detecting pin 135 may be arranged on both sides of the first detecting pin 132 of the material tray 130.

In an optional implementation, referring to FIG. 3 and FIG. 4, the translating and reversing module 115 of the present embodiment further includes at least one fixing seat 1116 arranged on the sub-driving part 1111, where the fixing seat 1116 is mounted on the frame 140 of the material conveying apparatus 10, thereby improving the installation stability of the entire translating and reversing module 115 on the frame 140.

For example, a fixing seat 1116 may be arranged at both ends of the sub-driving part 1111 along the material conveying direction, or only a fixing seat 1116 may be arranged at the upstream or downstream end of the sub-driving part 1111 in the material conveying direction.

The fixing seat 1116 may be detachably fixed on the frame 140 by screws 1117 or the like, which not only ensures the stability of the translating and reversing module 115 on the frame 140, but also facilitates the assembly and disassembly of the translating and reversing module 115.

Figure 7:
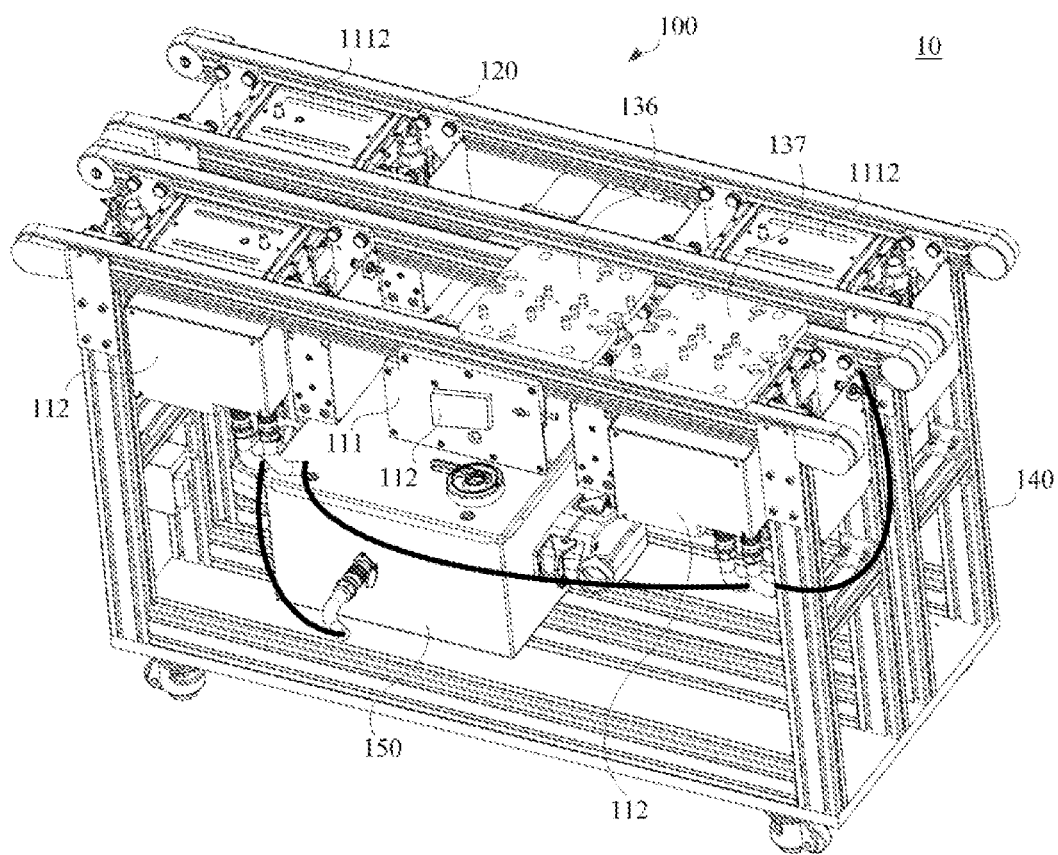
FIG. 7 is a state diagram of having two material trays in the second structure of the material conveying apparatus provided by an embodiment of the present disclosure.

FIG. 7 is a schematic structural diagram of having two material trays 130 in the second structure of the material conveying apparatus provided in the present embodiment. Referring to FIG. 7, when there are two material trays 130 on one conveying line, for example, there are two material trays 130 on the conveying line in the "going" direction, for the convenience of description, the material tray 130 located upstream in the material conveying direction is taken as an upstream material tray 136, and the material tray 130 located downstream in the material conveying direction is taken as a downstream material tray 137.

When the downstream material tray 137 moves to the mobile platform 1112 of the translating and reversing module 115, the upstream material tray 136 will continue to move to the mobile platform 1112, thus causing interference to the downstream material tray 137 on the mobile platform 1112 and affecting the translation of the downstream material tray 137 to the conveying line in the "returning" direction.

In order to avoid the above-mentioned situation, referring to FIG. 6 and FIG. 7, optionally, at least one fixing seat 1116 of the present embodiment is arranged at the upstream end of the sub-driving part 1111 along the material conveying direction. Referring to FIG. 3, the translating and reversing module 115 of the present embodiment may further include a preset blocking cylinder 1118 and a preset sensor 1119 which are provided on the fixing seat 1116, and the preset blocking cylinder 1118 and the preset sensor 1119 are both signal-connected to the sub-controlling module 112. Correspondingly, referring to FIG. 6, a second positioning hole 133 and a second detecting pin 134 are provided on the material tray 130.

When the preset sensor 1119 detects the second detecting pin 134, the preset sensors 1119 transmits an upstream material tray positioning completion signal to the sub-controlling module 112, and when receiving the upstream material tray positioning completion signal, the sub-controlling module 112 controls the preset blocking cylinder 1118 to extend into the second positioning hole 133.

For example, there are two material trays 130 on the conveying line in the "going" direction. When the downstream material tray 137 moves to the mobile platform 1112 of the translating and reversing module 115, the upstream material tray 136 will continue to move towards the mobile platform 1112. When the preset sensor 1119 on the fixing seat 1116 detects the second detecting pin 134 on the upstream material tray 136, the preset sensor 1119 transmits the upstream material tray positioning completion signal to the sub-controlling module 112. When receiving the upstream material tray positioning completion signal, the sub-control module 112 controls the preset blocking cylinder 1118 on the fixing seat 1116 to extend into the second positioning hole 133 of the upstream material tray 136, thereby stably blocking the upstream material tray 136 at the upstream side of the mobile platform 1112 and avoiding interference with the downstream material tray 137 on the mobile platform 1112.

As described above, the frame 140 of the material conveying apparatus 10 of the present embodiment is provided with a plurality of material conveying modules 110. For example, referring to FIG. 2, the frame 140 of the material conveying apparatus 10 is provided with two linear conveying modules 114, and the two linear conveying modules 114 are respectively arranged on two conveying lines with opposite material conveying directions to realize linear conveying of the material trays 130 on the two conveying lines. At the same time, the frame 140 of the material conveying apparatus 10 is also provided with four translating and reversing modules 115, and every two translating and reversing modules 115 are respectively arranged on one conveying line, so as to realize the function of mutual translation of the material tray 130 between the two conveying lines.

In order to ensure that the master controlling module can independently control each material conveying module 110 and meanwhile, can control other material conveying modules 110 according to a current state of each material conveying module 110, the material conveying module 110 of the present embodiment further includes at least two quick plugs 113. Referring to FIG. 2 and FIG. 3, the quick plugs 113 are arranged on the sub-controlling module 112 of the material conveying module 110, and one of the quick plugs 113 is configured for quick connection with the sub-controlling module 112 of the adjacent and same material conveying module 110 through a cable 200 integrating electricity, gas and signals. For example, referring to FIG. 2, in the four translating and reversing modules 115, one quick plug 113 on at least one translating and reversing module 115 is quickly connected to the sub-controlling module 112 of an adjacent translating and reversing module 115 by a cable 200. Specifically, one quick plug 113 on at least one translating and reversing module 115 is connected to one quick plug 113 on the adjacent translating and reversing module 115 by a cable 200.

In addition, the sub-controlling module 112 of one material conveying modules 110 of all the same material conveying modules 110 is signal-connected to the master controlling module by a cable 200 inserted into another quick plug.

For example, referring to FIG. 2, the sub-controlling module 112 of one translating and reversing modules 115 of the four translating and reversing modules 115 is signal-connected to the master controlling module by a cable 200 inserted into another quick plug 113. In this way, the master controlling module can control each translating and reversing module 115 to operate individually or simultaneously.

Second Embodiment

Referring to FIG. 1 and FIG. 4, the present embodiment provides a material conveying apparatus 10, including at least one conveying module group 100 and a master controlling module. Each conveying module group 100 includes a frame 140, a delivering part 120, and at least one the material conveying module 110 as described in the first embodiment, where the delivering part 120 and the material conveying module 110 are both arranged on the frame 140, and the material conveying module 110 is configured to drive a material tray 130 on the delivering part 120 to move, and the master controlling module is signal-connected to the material conveying module 110, so as to control the material conveying module 110 to operate.

For example, referring to FIG. 4, the material conveying apparatus 10 includes a conveying module group 100, where, as shown in FIG. 1, the conveying module group 100 includes a frame 140, delivering parts 120, and two the linear conveying modules 114 as described in the first embodiment and four translating and reversing modules 115. Taking the linear conveying modules 114 as an example, the sub-controlling modules 112 of the two linear conveying modules 114 are both signal-connected to the master controlling module, and the driving part 111 of the linear conveying module 114 is connected to the delivering part 120. During operation, the master controlling module controls the sub-controlling module 112 of the linear conveying module 114 to operate, so that the sub-controlling module 112 controls the driving part 111 to drive the delivering part 120 to operate, so as to drive the material tray 130 on the delivering part 120 to move along the material conveying direction.

Continuing to refer to FIG. 4, in specific setting, the conveying module group 100 may include multiple groups of delivering parts 120, where each group of delivering parts 120 extend along the material conveying direction, and each group of delivering parts 120 includes two delivering parts 120 arranged side-by-side and forms a conveying line. The multiple groups of delivering parts 120 are arranged side-by-side along the direction perpendicular to the material conveying direction, and the movement directions of two adjacent groups of delivering parts 120 are opposite.

For example, referring to FIG. 4, the conveying module group 100 includes two groups of delivering parts 120 arranged side-by-side, and the conveying lines formed by the two groups of delivering parts 120 have opposite material conveying directions. For example, the conveying line formed by one group of delivering parts 120 is a conveying line in the "going" direction, and the conveying line formed by the other group of delivering parts 120 is a conveying line in the "returning" direction.

In specific setting, there are a plurality of material conveying modules 110 in each conveying module group, and the plurality of material conveying modules 110 are the same or different as described in the first embodiment. The signal-connection between the sub-controlling modules 112 in two adjacent and same material conveying modules 110 is realized by a cable 200, and one sub-controlling modules 112 of all the same material conveying modules 110 is signal-connected to the master controlling module through a cable 200.

For example, referring to FIG. 4, each conveying line is provided with two translating and reversing modules 115, and the sub-controlling modules 112 of the four translating and reversing modules 115 are all signal-connected to the master controlling module. For example, in the four translating and reversing modules 115, the sub-controlling modules 112 of two adjacent translating and reversing modules 115 are signal-connected by a cable 200, and the sub-controlling module 112 of one translating and reversing module 115 is signal-connected to the master controlling module by the cable 200, so that the signal-connection between the master controlling module and all the translating and reversing modules 115 in respective conveying module group 100 is realized, thereby realizing the control of the four translating and reversing modules 115 by the master controlling module, and ensuring that the material tray 130 can be transferred back and forth between the two conveying lines under the driving of corresponding translating and reversing modules 115.

Referring to FIG. 1 and FIG. 4, the conveying module group 100 of the present embodiment may further include a module group controlling module 150. The sub-controlling module 112 in the material conveying module 110 is signal-connected to the module group controlling module 150, and the module group controlling module 150 is signal-connected to the master controlling module, and the master controlling module controls, through the module group controlling module 150, the sub-controlling module 112 to operate.

For example, referring to FIG. 4, in the conveying module group 100, signal-connection is realized between the sub-controlling module 112 of one of the translating and reversing modules 115 and the module group controlling module 150 through a cable 200 to realize the power supply from the module group controlling module 150 to the translating and reversing module 115 and the program control between the both. Signal-connection between the module group controlling module 150 and the master controlling module is realized through a cable 200, so that signal-connection is realized between the translating and reversing module 115 and the master controlling module.

Figure 8:
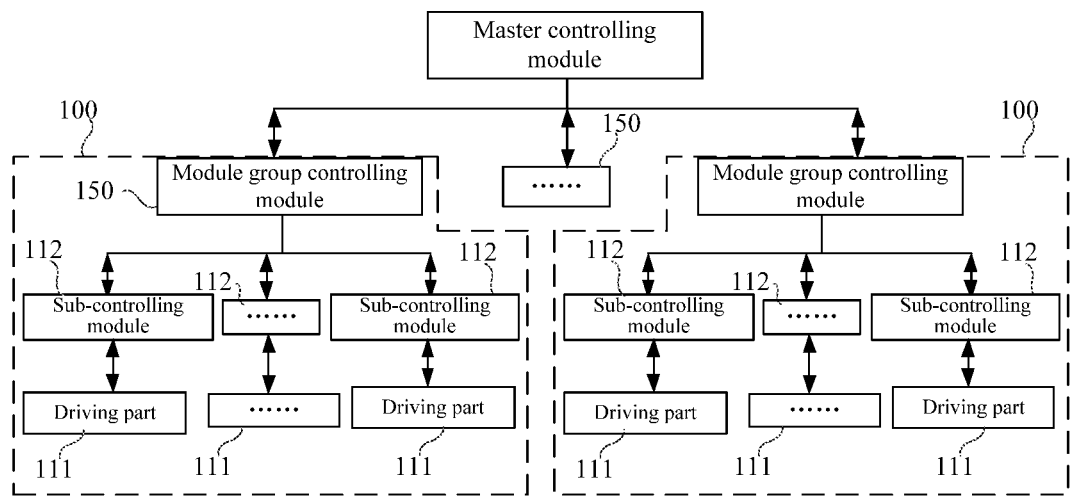
FIG. 8 is a structural block diagram of the material conveying apparatus provided by an embodiment of the present disclosure.

FIG. 8 is a structural block diagram of a material conveying apparatus provided by the present embodiment. Referring to FIG. 8, the dashed block represents the structural block diagram of each conveying module group 100. During operation, the master controlling module first controls the module group controlling module 150 in each conveying module group 100, so that the module group controlling module 150 controls the sub-controlling module 112 of the material conveying module 110, and then, under the control of the module group controlling module 150, the sub-controlling module 112 drives the driving part 111 of the material conveying module 110 to operate, thereby realizing driving the material tray 130.

The master controlling module may specifically be an OPC UA client, where OPC (OLE for Process Control) technology refers to establishing a unified data access specification between industrial control devices and control software in order to establish an interface standard for communications between applications of industrial control system. UA (Unified Architecture) is the next generation OPC standard, which can obtain real-time and historical data and time by providing a complete, safe and reliable cross-platform architecture.

The module group controlling module 150 may be an embedded controlling module containing an OPC UA server.

Referring to FIG. 2, when each conveying module group 100 includes a plurality of material conveying modules 110 with the same function, for example, the conveying module group 100 includes four translating and reversing modules 115, where the sub-controlling module 112 of any one of translating and reversing modules 115 is signal-connected to the module group controlling module 150, and because of the signal-connection between the sub-controlling modules 112 of two adjacent translating and reversing modules 115, in this way, when the module group controlling module 150 is signal-connected to the master controlling module, the master controlling module can realize independent control of the four translating and reversing modules 115 through the module group controlling module 150 (as shown in FIG. 8).

Figure 9:
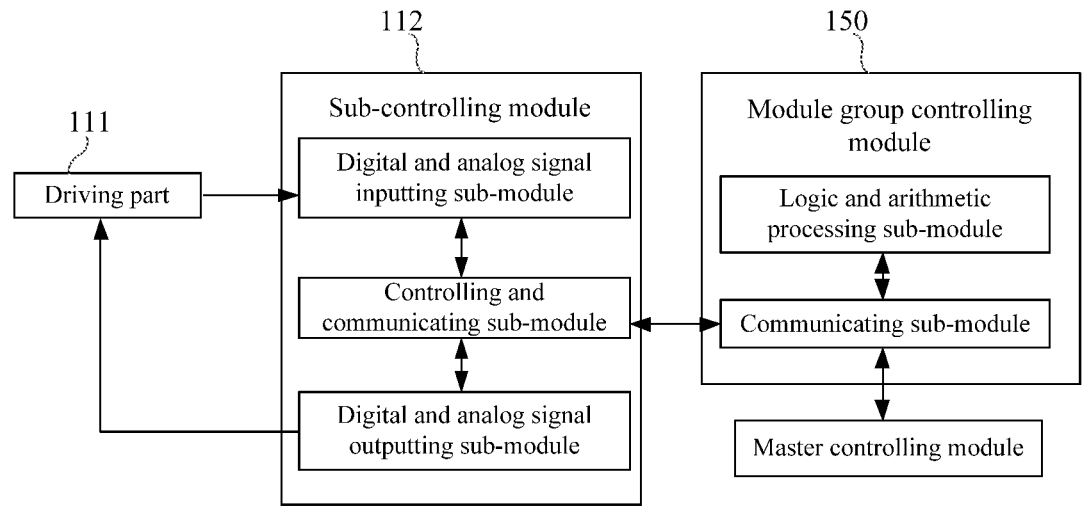
FIG. 9 is a partial structural block diagram in FIG. 8.

FIG. 9 is a partial structural block diagram in FIG. 8. Referring to FIG. 9, specifically, the sub-controlling module 112 of the present embodiment may include a digital and analog signal inputting sub-module, a digital and analog signal outputting sub-module, and a controlling and communicating sub-module. The module group controlling module 150 includes a logic and arithmetic processing sub-module and a communicating sub-module.

The digital and analog signal inputting sub-module is configured to collect an operation signal of the driving part 111 in the material conveying module 110 and transmit the operation signal to the controlling and communicating sub-module.

For example, when the material conveying module 110 is the translating and reversing module 115, the digital and analog signal inputting sub-module can collect a positioning completion signal of the operation position sensor 1114 of the translating and reversing module 115 and transmit the operation signal to the controlling and communicating sub-module.

The controlling and communicating sub-module is configured to receive the operation signal and transmit the operation signal to the communicating sub-module. For example, the controlling and communicating sub-module receives the positioning completion signal of the operation position sensor 1114 and transmits the positioning completion signal to the communicating sub-module.

The communicating sub-module is configured to receive the operation signal and transmit the operation signal to the master controlling module. For example, after receiving the positioning completion signal, the communicating sub-module transmits the positioning completion signal to the master controlling module.

The master controlling module is configured to receive the operation signal, and process the operation signal into a control signal, and transmit the control signal to the logic and arithmetic processing sub-module through the communicating sub-module. For example, after receiving the positioning completion signal of the operation position sensor 1114, the master controlling module processes the positioning completion signal into a control signal through an internal program, and transmits the control signal to the logic and arithmetic processing sub-module through the communicating sub-module. The control signal is configured to finally control the sub-driving part 1111, such as lifting a jacking cylinder.

The logic and arithmetic processing sub-module is configured to receive the above-mentioned control signal, and convert the above-mentioned control signal into a control instruction, and at the same time transmit the control instruction to the communicating sub-module. For example, after receiving the above-mentioned control signal, the logic and arithmetic processing sub-module converts the control signal into a control instruction through the OPC UA program, and transmits the control instruction to the communicating sub-module.

The communicating sub-module is configured to receive the above-mentioned control instruction and transmit the control instruction to the digital and analog signal outputting sub-module through the controlling and communicating sub-module, and the digital and analog signal outputting sub-module controls the driving part 111 according to the control instruction. For example, after receiving the above-mentioned control instruction, the communicating sub-module transmits the control instruction to the digital and analog signal outputting sub-module of the sub-controlling module 112 through the controlling and communicating sub-module, and the digital and analog signal outputting sub-module controls, according to the control instruction, the sub-driving part 1111 in the driving part 111, such as controlling a jacking cylinder to perform a lifting action, so that the material tray 130 on the delivering part 120 is lifted to separate from the front side of the conveying part 120 so as to prepare for the subsequent translation of the material tray 130.

In the present embodiment, the master controlling module is further configured to generate configuration file information and transmit the configuration file information to the communicating sub-module. For example, when the material conveying module 110 needs to perform linearly conveying of the material tray 130, the master controlling module needs to generate configuration file information of the linear conveying module 114 and transmit the configuration file information to the communicating sub-module of the module group controlling module 150.

The communicating sub-module is configured to receive the configuration file information and transmit the configuration file information to the logic and arithmetic processing sub-module. For example, after receiving the configuration file information of the above-mentioned linear conveying module 114, the communicating sub-module transmits the configuration file information to the logic and arithmetic processing sub-module of the module group controlling module 150.

The logic and arithmetic processing sub-module is configured to receive the configuration file information, parse the configuration file information and convert it into a control instruction, and then transmit the control instruction to the communicating sub-module. For example, after receiving the configuration file information of the above-mentioned linear conveying module 114, the logic and arithmetic processing sub-module first parses the configuration file information, converts the configuration file information into a control instruction, and then transmits the control instruction to the communicating sub-module.

The communicating sub-module receives the control instruction and transmits the control instruction to the sub-controlling module 112. For example, after receiving the above-mentioned control instruction, the communicating sub-module transmits the control instruction to the sub-controlling module 112 of the linear conveying module 114.

The sub-controlling module 112 configures the port of the sub-controlling module 112 as an input or output port of a designated function according to the control instruction. For example, the sub-controlling module 112 configures its port as the input or output port of the linear conveying function according to the above-mentioned control instruction, so that the master controlling module performs control of the linear conveying function on the sub-controlling module 112.

The above-mentioned designated function includes any one of linear conveying, translating and reversing, lifting, curved conveying, jacking positioning, buffering, rotating, flipping, and climbing.

Based on the above-mentioned content, when it is necessary to control other function modules, such as the sub-controlling module 112 of the translating and reversing function, through the master controlling module, it is only necessary to retrieve the configuration file information of the master controlling module for the function, and then the module group controlling module 150 can complete the port configuration of the sub-controlling module 112 of the translating and reversing module 115, so as to realize that the master controlling module performs the control of the translating and reversing function on the sub-controlling module 112.

Figure 10:
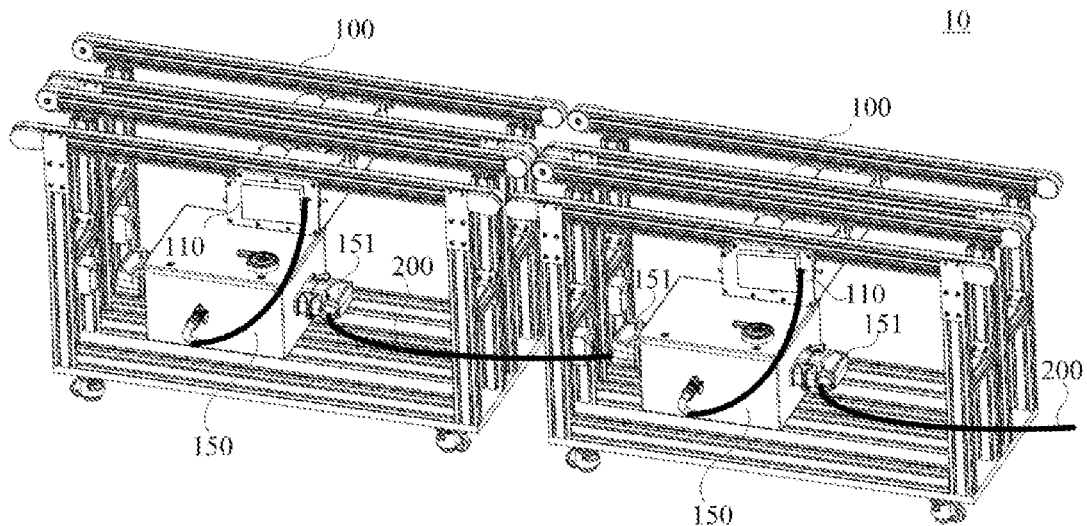
FIG. 10 is a schematic diagram of having two conveying module groups in the first structure of the material conveying apparatus provided by an embodiment of the present disclosure.

FIG. 10 is a schematic diagram of having two conveying module groups in the first structure of the material conveying apparatus provided by the present embodiment. Referring to FIG. 10, the material conveying apparatus 10 of the present embodiment includes a plurality of conveying module groups 100, where the plurality of conveying module groups 100 are arranged in sequence along a material conveying direction, and signal-connection between the module group controlling modules 150 in two adjacent conveying module groups 100 is realized by a cable 200, and the outermost module group controlling module 150 arranged along the material conveying direction is signal-connected to the master controlling module by a cable 200.

For example, referring to FIG. 10, the material conveying apparatus 10 includes two conveying module groups 100 arranged in sequence along the material conveying direction, and the module group controlling module 150 in each conveying module group 100 is provided with a connection port 151, and signal-connection between the module group controlling modules 150 of the two conveying module groups 100 is realized by a cable 200 connected to the connection port 151, and the right module group controlling module 150 is signal-connected to the master controlling module by a cable 200, so as to realize that the master controlling module controls the two module group controlling modules 150.

Different from the above-mentioned example, the leftmost module controlling module 150 of the two module group controlling modules 150 can also be signal-connected to the master controlling module. In this way, the signal-connection can be realized between the two module group controlling modules 150 and the master controlling module, so as to realize that the master controlling module controls the two module group controlling modules 150.

Figure 11:
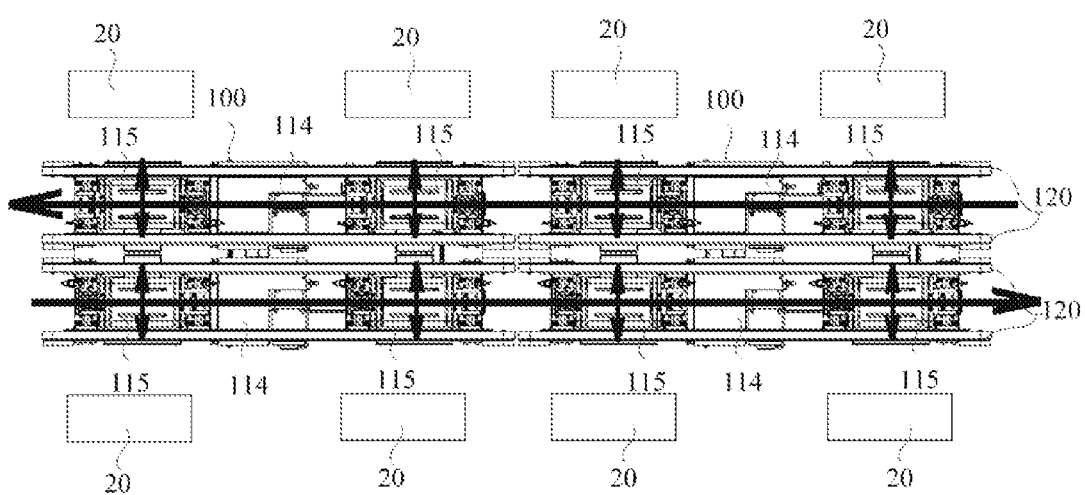
FIG. 11 is a schematic structural diagram of having upper and lower two "going-returning" conveying lines in the second structure of the material conveying apparatus provided by an embodiment of the present disclosure.

FIG. 11 is a schematic structural diagram of having upper and lower two "going-returning" conveying lines in the second structure of the material conveying apparatus provided by the present embodiment. Referring to FIG. 11, taking the material conveying apparatus of the second structure having upper and lower two conveying lines in "going-returning" directions as an example, where the lower arrow represents the "going" moving direction of the material tray 130, that is, the lower conveying line is a conveying line in the "going" direction; and the upper arrow represents the "returning" moving direction of the material tray 130, that is, the upper conveying line is a conveying line in the "retuning" direction; and the upper and lower two conveying lines form a complete conveying loop.

Continuing to refer to FIG. 11, each conveying line is provided with two linear conveying modules 114 and four translating and reversing modules 115 at intervals, where the four translating and reversing modules 115 on one conveying line and the four translating and reversing modules 115 on the other conveying line are respectively aligned and arranged along the direction perpendicular to the material conveying direction, so as to ensure that the material tray 130 on one of the conveying lines can be translated to the translating and reversing module 115 of the other conveying line through the translating and reversing module 115 on the conveying line.

Each translating and reversing module 115 can drive the material tray 130 on it to move in two degrees of freedom perpendicular to the material conveying direction. When reaching the mobile platform 1112 of any one of the translating and reversing modules 115, the material tray 130 can move in three directions of "forward, left, and right", so as to realize that the material tray 130 can realize functions of large circulation and small circulation on the two conveying lines in the "going-returning" directions.

For the convenience of description, in the following, the linear conveying modules 114 on the conveying line in the "going" direction are respectively regarded as the first linear conveying module and the second linear conveying module along the material conveying direction, and the linear conveying modules 114 on the conveying line in the "returning" direction are respectively regarded as the third linear conveying module and the fourth linear conveying module along the material conveying direction. At the same time, the translating and reversing modules 115 on the conveying line in the "going" direction are respectively regarded as the first translating and reversing module, the second translating and reversing module, the third translating and reversing module, and the fourth translating and reversing module along the material conveying direction, and the translating and reversing modules 115 on the conveying line in the "returning" direction are respectively regarded as the fifth translating and reversing module, the sixth translating and reversing module, the seventh translating and reversing module and the eighth translating and reversing module along the material conveying direction.

For example, referring to FIG. 11, a machine platform 20 is provided on one side of each translating and reversing module 115. In this way, four machine platforms 20 are arranged on one side of the conveying line in the "going" direction, and respective machine platforms 20 are respectively arranged on one side of corresponding translating and reversing modules 115; and four machine platforms 20 are arranged on one side of the conveying line in the "returning" direction, and respective machine platforms 20 are respectively arranged on one side of corresponding translating and reversing modules 115.

For the convenience of description, in the following, the machine platforms 20 on the side of the conveying line in the "going" direction are respectively regarded as the first machine platform, the second machine platform, the third machine platform and the fourth machine platform along the material conveying direction, and the machine platforms 20 on the conveying line in the "returning" direction are respectively regarded as the fifth machine platform, the sixth machine platform, the seventh machine platform and the eighth machine platform along the material conveying direction.

Referring to FIG. 11, the position of the first translating and reversing module—the position of the fourth translating and reversing module—the position of the fifth translating and reversing module—the position of the eighth translating and reversing module forms a loop of large circulation. For example, the materials on the first machine platform can be transported to the position of the fourth translating and reversing module through the first linear conveying module and the second linear conveying module on the conveying line in the "going" direction, and then the material tray 130 can be translated to the rightmost end of the conveying line in the "returning" direction through the fourth translating and reversing module, and then the material tray 130 can be transported to the leftmost end of the conveying line in the "returning" direction, e.g. the position of the eighth translating and reversing module, through the third linear conveying module and the fourth linear conveying module, and the materials in the material tray 130 are put on the eighth machine platform.

It can be understood that, in the above-mentioned loop of large circulation, materials can be exchanged between all eight machine platforms 20 and the material tray 130.

Continuing to refer to FIG. 11, the positions of any four translating and reversing modules 115 between the position of the first translating and reversing module and the position of the eighth translating and reversing module can form a loop of small circulation. It should be noted that, in any four translating and reversing modules 115, two of the translating and reversing modules 115 are located on the conveying line in the "going" direction, and the other two translating and reversing modules 115 are located at corresponding positions on the conveying direction in the "returning" direction.

As a first example, the position of the first translating and reversing module—the position of the second translating and reversing module—the position of the seventh translating and reversing module—the position of the eighth translating and reversing module forms a loop of small circulation. For example, the materials on the first machine platform can be transported to the position of the second translating and reversing module through the first linear conveying module on the conveying line in the "going" direction, and then the material tray 130 can be translated to the seventh translating and reversing module on the conveying line in the "returning" direction through the second translating and reversing module, and then the material tray 130 can be transported to the position of the eighth translating and reversing module through the fourth linear conveying module, and the materials in the material tray 130 are put on the eighth machine platform.

In the above-mentioned loop of small circulation, materials can be exchanged between the material tray 130 and any one of the first machine platform, the second machine platform, the seventh machine platform and the eighth machine platform.

As a second example, the position of the second translating and reversing module—the position of the third translating and reversing module—the position of the sixth translating and reversing module—the position of the seventh translating and reversing module forms a loop of small circulation. For example, the materials on the second machine platform can be transported to the position of the third translating and reversing module through the first linear conveying module and the second linear conveying module on the conveying line in the "going" direction, and then the material tray 130 can be translated to the sixth translating and reversing module on the conveying line in the "returning" direction through the third translating and reversing module, and then the material tray 130 can be transported to the position of the seventh translating and reversing module through the third linear conveying module and the fourth linear conveying module, and the materials in the material tray 130 are put on the seventh machine platform.

In the above-mentioned the loop of small circulation, materials can be exchanged between the material tray 130 and any one of the second machine platform, the third machine platform, the sixth machine platform and the seventh machine platform.

Figure 12:
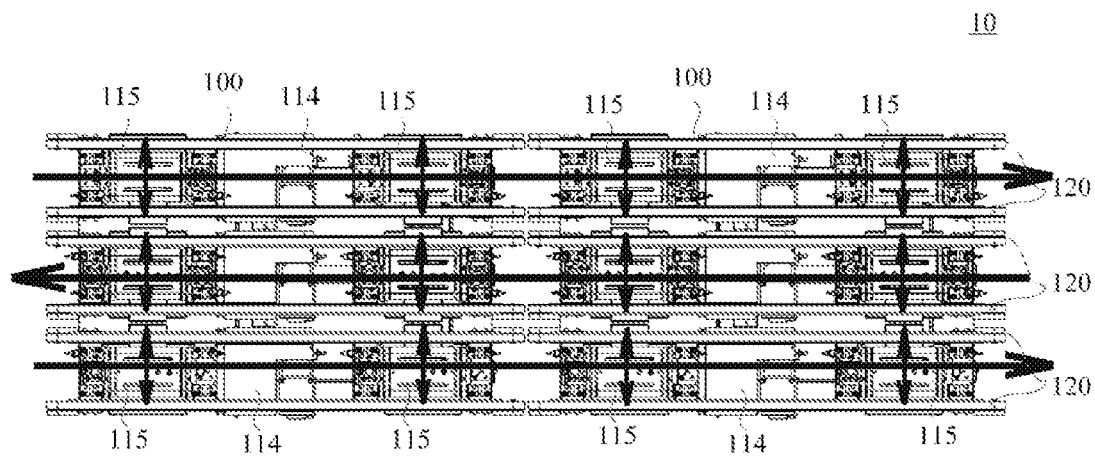
FIG. 12 is a schematic structural diagram of having, upper, middle and lower, three "going-returning" conveying lines in the second structure of the material conveying apparatus provided by an embodiment of the present disclosure.

FIG. 12 is a schematic structural diagram of having upper, middle and lower three "going-returning" conveying lines in the second structure of the material conveying apparatus provided by the present embodiment. Referring to FIG. 12, further taking the material conveying apparatus 10 having upper, middle and lower three conveying lines in "going-returning" directions as an example, where the lower arrow represents the "going" moving direction of the material tray 130, that is, the lower conveying line is a conveying line in the "going" direction; and the middle arrow represents the "returning" moving direction of the material tray 130, that is, the middle conveying line is a conveying line in the "returning" direction; and the upper arrow represents the "going" moving direction of the material tray 130, that is, the upper conveying line is a conveying line in the "going" direction. In this way, the upper conveying line and the middle conveying line form the complete conveying loop of the upper half, while the lower conveying line and the middle conveying line form the complete conveying loop of the lower half.

It should be noted that, for the material movement paths of the complete conveying loop of the upper half and the complete conveying loop of the lower half, reference may be directly made to the content of the conveying loop in FIG. 11, which will not be repeated here.

Figure 13:
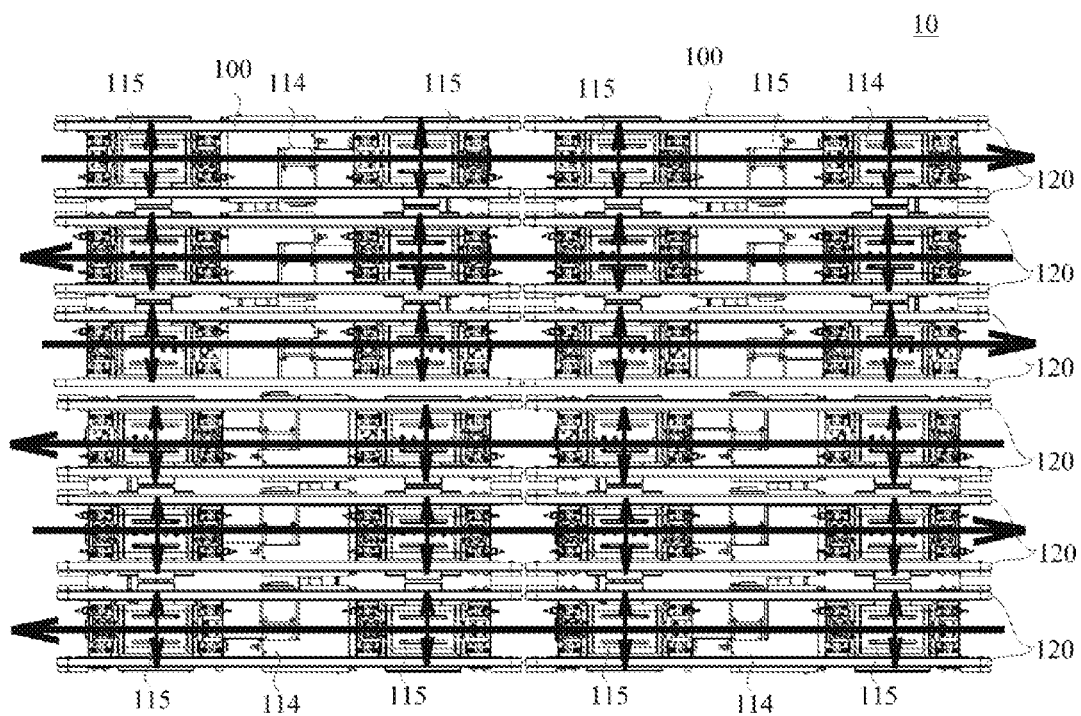
FIG. 13 is a schematic structural diagram of having six "going-returning" conveying lines in the second structure of the material conveying apparatus provided by an embodiment of the present disclosure.

FIG. 13 is a schematic structural diagram of having six "going-returning" conveying lines in the second structure of the material conveying apparatus provided by the present embodiment. Referring to FIG. 13, further taking the material conveying apparatus 10 including six conveying lines in "going-returning" directions from top to bottom as an example, where the arrow in the first row represents the "going" moving direction of the material tray 130, that is, the conveying line in the first row is a conveying line in the "going" direction; the arrow in the second row represents the "returning" moving direction of the material tray 130, that is, the conveying line in the second row is a conveying line in the "returning" direction; the arrow in the third row represents the "going" moving direction of the material tray 130, that is, the conveying line in the third row is a conveying line in the "going" direction; the arrow in the fourth row represents the "returning" moving direction of the material tray 130, that is, the conveying line in the fourth row is a conveying line in the "returning" direction; the arrow in the fifth row represents the "going" moving direction of the material tray 130, that is, the conveying line in the fifth row is a conveying line in the "going" direction; and the arrow in the sixth row represents the "returning" moving direction of the material tray 130, that is, the conveying line in the sixth row is a conveying line in the "returning" direction.

In this way, the conveying line in the first row and the conveying line in the second row form a first complete conveying loop, and the conveying line in the third row and the conveying line in the second row form a second complete conveying loop, and the conveying line in the fourth row of and the conveying line in the third row form a third complete conveying loop, and the conveying line in the fifth row and the conveying line in the fourth row form a fourth complete conveying loop, and the conveying line in the sixth row and the conveying line in the fifth row form a fifth complete conveying loop.

It should be noted that, for the material movement paths of the above-mentioned five complete conveying loops, reference may be directly made to the content of the conveying loop in FIG. 10, which will not be repeated here.

Since each conveying line in FIG. 12 and FIG. 13 is provided with translating and reversing modules 115, the material tray 130 can move on all conveying lines.

It is worth noting that the linear conveying module 114 may simultaneously have the function of moving the material tray 130 in the "going" direction and the "retuning" direction, that is to say, any linear conveying module 114 can drive the material tray 130 to move along the "going" direction, and can also drive the material tray 130 to move along the "returning" direction. Multiple conveying lines form a conveying plane, and the conveying direction of the material tray 130 can be changed at any translating and reversing module 115, thereby realizing the universal conveying of materials.

The present embodiment provides a material conveying apparatus. By providing a sub-controlling module on each driving part and fixing the sub-controlling module on the driving part, all connecting wires on the driving part are connected to the sub-controlling module, so that each material conveying module in the material conveying apparatus forms a modular structure with a specific function. In this way, it is only needed to retrieve the configuration file information corresponding to the function mode of the material conveying module in the master controlling module, so as to complete the port function configuration of the master controlling module and the sub-controlling module, and then the corresponding function of the material conveying module can be started through the master controlling module, so as to enable the material conveying module to realize the corresponding function operation.

When the layout of the production line of the material conveying apparatus changes, for example, when the position of the driving part in the material conveying apparatus changes, since the sub-controlling module and the driving part together form an independent modular structure, there is no need to rewire between the driving part and the master controlling module, and thus, the programs in the master controlling module and the sub-controlling module do not need to be changed, and it is only needed to retrieve corresponding configuration file information of the master controlling module and then the ports of the master controlling module and the sub-controlling module can be configured as the input or output of a designated function, thus realizing the accurate operation of the material conveying module under the new layout. In addition, because the driving part and the sub-controlling module form a modular structure, the assembly and disassembly procedures of the material conveying module are simplified, and the assembly and disassembly procedures of the entire material conveying apparatus are simplified, and the labor input cost and workload are reduced.

Finally, it should be noted that the above embodiments are only used to illustrate the technical solutions of the present disclosure, but not to limit them; and although the present disclosure has been described in detail with reference to the foregoing embodiments, persons of ordinary skill in the art should understand that the technical solutions described in the foregoing embodiments may still be modified, or some or all of the technical features may be equivalently replaced; however, these modifications or substitutions do not make the essence of the corresponding technical solutions deviate from the scope of the technical solutions of the embodiments of the present disclosure.

What is claimed is:

1. A material conveying apparatus, comprising at least one conveying module group and a master controlling module:
   wherein the at least one conveying module group comprises a frame, multiple groups of delivering parts, and a plurality of material conveying modules;
   the multiple groups of delivering parts and a plurality of the material conveying modules are both arranged on the frame, each group of delivering parts extends along the material conveying direction, and each group of delivering parts forms a conveying line;

the multiple groups of delivering parts are arranged side-by-side along a direction perpendicular to the material conveying direction, and movement directions of two adjacent groups of delivering parts are opposite;

the material conveying module is configured to drive a material tray on the delivering part to move, and the master controlling module is signal-connected to the material conveying module to control the material conveying module to operate;

a plurality of the material conveying modules comprises a first material conveying module and a second material conveying module;

the first material conveying module is a linear conveying module for driving the material tray to move along the material conveying direction;

the second material conveying module is a translating and reversing module for driving the material tray to move along the direction perpendicular to the material conveying direction wherein each of the material conveying modules comprises a driving part and a sub-controlling module;

wherein the driving part is configured to drive a material tray to move, the sub-controlling module is fixed on the driving part, and an end of the sub-controlling module is signal-connected to the driving part and another end of the sub-controlling module is configured to signal-connect to a master controlling module and the sub-controlling module is configured to, under an action of the master controlling module, control the driving part to operate.

2. The material conveying apparatus according to claim 1, wherein the driving part comprises any one of a linear conveying part, a translating and reversing part, a curved conveying part, and a jacking positioning part.

3. The material conveying apparatus according to claim 2, wherein the driving part comprises a linear conveying part, and the linear conveying part comprises a motor and a transmission part;

the material tray is placed on a delivering part of the material conveying apparatus, the transmission part is connected to the delivering part, the motor is connected to the transmission part, and the motor drives, through the transmission part, the delivering part to move, to drive the material tray to move; and the sub-controlling module is signal-connected to the motor.

4. The material conveying apparatus according to claim 2, wherein the driving part comprises a translating and reversing part, the translating and reversing part comprises a sub-driving part and a mobile platform, the sub-driving part is located on a back side of the delivering part of the material conveying apparatus, the mobile platform is arranged on a side of the sub-driving part facing the delivering part, the sub-controlling module is fixed on the sub-driving part, and the sub-controlling module is signal-connected to the sub-driving part;

the sub-controlling module is configured to, when the material tray on a front side of the delivering part is moved to the mobile platform, control the sub-driving part to drive the mobile platform to move toward the front side of the delivering part, to lift the material tray; and a conveying part is provided on the mobile platform, and the sub-controlling module is signal-connected to the conveying part, so as to, when the sub-driving part completes a lifting operation, drive the material tray to move perpendicular to an extending direction of the delivering part by driving the conveying part.

5. The material conveying apparatus according to claim 4, wherein the sub-driving part is a jacking cylinder, a movable end of the jacking cylinder is connected to the mobile platform, and the sub-controlling module is signal-connected to an electromagnetic valve of the jacking cylinder, to control the jacking cylinder to operate.

6. The material conveying apparatus according to claim 4, wherein the conveying part comprises a conveying driving part and a sub-delivering part, the conveying driving part is connected to the sub-delivering part, to drive the sub-delivering part to move perpendicular to the extending direction of the delivering part, and the sub-controlling module is signal-connected to the conveying driving part to control the conveying driving part to operate.

7. The material conveying apparatus according to claim 4, wherein the translating and reversing part further comprises an operation position sensor and an operation position blocking cylinder arranged on the mobile platform, and the operation position sensor and the operation position blocking cylinder are both signal-connected to the sub-controlling module, the material tray is provided with a first positioning hole and a first detecting pin, and when the operation position sensor detects the first detecting pin, the operation position sensor transmits a positioning completion signal to the sub-controlling module, and when receiving the positioning completion signal, the sub-controlling module controls the operation position blocking cylinder to extend into the first positioning hole.

8. The material conveying apparatus according to claim 4, wherein the translating and reversing part further comprises at least one fixing seat arranged on the sub-driving part, and the fixing seat is mounted on the frame of the material conveying apparatus.

9. The material conveying apparatus according to claim 8, wherein at least one of the fixing seat is arranged at an upstream end of the sub-driving part along a material conveying direction;

the translating and reversing part further comprises a preset blocking cylinder and a preset sensor arranged on the fixing seat, and the preset blocking cylinder and the preset sensor are both signal-connected to the sub-controlling module; the material tray is provided with a second positioning hole and a second detecting pin, and when the preset sensor detects the second detecting pin, the preset sensor transmits an upstream material tray positioning completion signal to the sub-controlling module, and when receiving the upstream material tray positioning completion signal, the sub-controlling module controls the preset blocking cylinder to extend into the second positioning hole.

10. The material conveying apparatus according to claim 1, wherein the material conveying module further comprises at least two quick plugs, the at least two quick plugs are arranged on the sub-controlling module, and one of the quick plugs is configured to connect to a sub-controlling module of an adjacent and same material conveying module through a cable integrating electricity and signals; and a sub-controlling module of one material conveying module of all same material conveying modules is signal-connected to the master controlling module by a cable inserted into another of the quick plugs.

11. The material conveying apparatus according to claim 1, wherein the at least one conveying module group further comprises a module group controlling module;
   a sub-controlling module in the material conveying module is signal-connected to the module group controlling module, the module group controlling module is signal-connected to the master controlling module, and the master controlling module controls, through the module group controlling module, the sub-controlling module to operate.

12. The material conveying apparatus according to claim 11, wherein the sub-controlling module comprises a digital and analog signal inputting sub-module, a digital and analog signal outputting sub-module, and a controlling and communicating sub-module; the module group controlling module comprises a logic and arithmetic processing sub-module and a communicating sub-module;
   the digital and analog signal inputting sub-module is configured to collect an operation signal of a driving part in the material conveying module, and transmit the operation signal to the controlling and communicating sub-module;
   the controlling and communicating sub-module is configured to receive the operation signal, and transmit the operation signal to the communicating sub-module;
   the communicating sub-module is configured to receive the operation signal, and transmit the operation signal to the master controlling module;
   the master controlling module is configured to receive the operation signal, and process the operation signal into a control signal, and transmit the control signal to the logic and arithmetic processing sub-module through the communicating sub-module;
   the logic and arithmetic processing sub-module is configured to receive the control signal, and convert the control signal into a control instruction, and meanwhile, transmit the control instruction to the communicating sub-module; and
   the communicating sub-module is configured to receive the control instruction, and transmit the control instruction to the digital and analog signal outputting sub-module through the controlling and communicating sub-module, and the digital and analog signal outputting sub-module controls the driving part according to the control instruction.

13. The material conveying apparatus according to claim 12, wherein the master controlling module is further configured to generate configuration file information, and transmit the configuration file information to the communicating sub-module;
   the communicating sub-module is configured to receive the configuration file information, and transmit the configuration file information to the logical and arithmetic processing sub-module;
   the logic and arithmetic processing sub-module is configured to receive the configuration file information, parse the configuration file information and convert the configuration file information into a control instruction, and then transmit the control instruction to the communicating sub-module;
   the communicating sub-module receives the control instruction and transmits the control instruction to the sub-controlling module; and
   the sub-controlling module configures a port of the sub-controlling module as an input or output port of a designated function according to the control instruction;
   wherein the designated function comprises any one of linear conveying, translating and reversing, lifting, curved conveying, jacking positioning, buffering, rotating, flipping and climbing.

14. The material conveying apparatus according to claim 11, wherein, each conveying module group comprises a plurality of material conveying modules, and the plurality of material conveying modules are same or different;
   sub-controlling modules in two adjacent and same material conveying modules are signal-connected, and the sub-controlling module of one material conveying module of all same material conveying modules is signal-connected to the module group controlling module.

15. The material conveying apparatus according to claim 14, wherein the material conveying apparatus comprises a plurality of conveying module groups; and
   the plurality of conveying module groups are arranged in sequence along a material conveying direction, and the module group controlling modules of two adjacent conveying module groups are signal-connected, and an outermost module group controlling module arranged along the material conveying direction is signal-connected to the master controlling module.

* * * * *